(12) United States Patent
Bai et al.

(10) Patent No.: US 11,405,088 B2
(45) Date of Patent: Aug. 2, 2022

(54) BEAM MANAGEMENT USING CHANNEL STATE INFORMATION PREDICTION

(71) Applicant: QUALCOMM Incorporated, San Diego, CA (US)

(72) Inventors: Tianyang Bai, Bridgewater, NJ (US); Juergen Cezanne, Ocean Township, NJ (US); Jung Ho Ryu, Fort Lee, NJ (US); Kiran Venugopal, Raritan, NJ (US); Hua Wang, Basking Ridge, NJ (US); Vasanthan Raghavan, West Windsor Township, NJ (US); Kobi Ravid, Closter, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 16/747,683

(22) Filed: Jan. 21, 2020

(65) Prior Publication Data

US 2020/0259545 A1  Aug. 13, 2020

Related U.S. Application Data

(60) Provisional application No. 62/802,530, filed on Feb. 7, 2019.

(51) Int. Cl.
*H04W 72/04* (2009.01)
*H04B 7/06* (2006.01)
(Continued)

(52) U.S. Cl.
CPC .............. *H04B 7/0695* (2013.01); *H04B 7/01* (2013.01); *H04B 7/0626* (2013.01);
(Continued)

(58) Field of Classification Search
CPC ...... H04B 7/01; H04B 7/0617; H04B 7/0626; H04B 7/063; H04B 7/0632; H04B 7/0695;
(Continued)

(56) References Cited

U.S. PATENT DOCUMENTS

2017/0207843 A1\* 7/2017 Jung ................... H04B 7/0695
2018/0035438 A1\* 2/2018 Pao ................... H04W 72/1231
(Continued)

FOREIGN PATENT DOCUMENTS

WO  WO-2018141238 A1  8/2018
WO  WO-2018230862 A1  12/2018

OTHER PUBLICATIONS

International Search Report and Written Opinion—PCT/US2020/014615—ISA/EPO—dated Apr. 22, 2020.

*Primary Examiner* — Phuc H Tran
(74) *Attorney, Agent, or Firm* — Holland & Hart LLP

(57) ABSTRACT

Methods, systems, and devices for wireless communications are described. A user equipment (UE) may transmit, to a base station such as a eNodeB (eNB), a next-generation NodeB or giga-NodeB (either of which may be referred to as a gNB)), an indication of a value of a channel quality parameter of a wireless link including a first beam pair between the UE and the base station. The UE may also transmit, to the base station, side information different from and in addition to the indication of the value of the channel quality information, and receive, in response to the transmitted indication of the value and the transmitted side information, an indication of resources for the UE to use to communicate on the wireless link.

30 Claims, 19 Drawing Sheets

(51) Int. Cl.
*H04B 7/01* (2006.01)
*H04W 24/10* (2009.01)
*H04W 72/14* (2009.01)

(52) U.S. Cl.
CPC .......... *H04B 7/0632* (2013.01); *H04W 24/10* (2013.01); *H04W 72/046* (2013.01); *H04W 72/14* (2013.01)

(58) Field of Classification Search
CPC ............... H04W 24/10; H04W 72/046; H04W 72/085; H04W 72/14
See application file for complete search history.

(56) References Cited

U.S. PATENT DOCUMENTS

2018/0288757 A1* 10/2018 Sun ........................ H04W 24/04
2018/0302889 A1* 10/2018 Guo ........................ H04B 7/088
2020/0014451 A1* 1/2020 Yang ....................... H04B 7/088

* cited by examiner

BEAM MANAGEMENT USING CHANNEL STATE INFORMATION PREDICTION

CROSS REFERENCE

The present Application for Patent claims the benefit of U.S. Provisional Patent Application No. 62/802,530 by BAI et al., entitled "BEAM MANAGEMENT USING CHANNEL STATE INFORMATION PREDICTION," filed Feb. 7, 2019, assigned to the assignee hereof, and expressly incorporated herein.

BACKGROUND

The following relates generally to wireless communications, and more specifically to beam management using channel state information prediction.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless multiple-access communications systems may operate in millimeter wave (mmW) frequency ranges (e.g., 28 GHz, 40 GHz, 60 GHz). Communication at these frequencies may be beamformed to overcome attenuation (e.g., path loss), which may be influenced by various factors, such as temperature, diffraction, and the like.

Beamformed communications between two communication devices, such as a base station and a UE, may use one or more beam pairs. A beam pair may include one beam associated with one communication device for transmission and/or reception that may relate to another beam of another communication device for transmission and/or reception. For example, an uplink (or downlink) beam associated with a UE and an uplink (or downlink) beam associated with a base station used for uplink (or downlink) beamformed communications may constitute an uplink (or downlink) beam pair.

In some examples, a beam pair used for communication between two communication devices may become misaligned due to mobility or dynamic blockages, and may result in a beam failure. Current beam management procedures, however, may result in large numbers of beam failure events and resultant excessive overhead for beam recovery signaling.

SUMMARY

The described techniques relate to improved methods, systems, devices, and apparatuses that support beam management using channel state information prediction. Generally, the described techniques provide for enabling a user equipment (UE) and base station (e.g., eNodeB (eNB), a next-generation NodeB or giga-NodeB (either of which may be referred to as a gNB)) to reduce or eliminate overhead and latencies associated with processes related to beam management by supporting a proactive approach to predict a beam event, such as a beam switch event or a beam failure event, prior to an actual beam event occurrence. The techniques described herein may forecast a beam event using a learning algorithm (also referred to herein as a prediction algorithm), which may take as input one or more parameters, such as real-time channel measurements, past channel measurements, and side information (different from and in addition to the channel measurements), or a combination of these. This may enable the base station, or the UE, or both, to proactively switch active beams (e.g., one or more of a transmit beam or receive beam) in advance of a beam event (e.g., a beam failure event). In such cases, the base station and the UE may experience reduced occurrences of beam failure recovery, as well as improved operational characteristics, such as reduced overhead signaling and decreased communications latency.

A method of wireless communications at a UE is described. The method may include transmitting, to a base station, an indication of a value of a channel quality parameter of a wireless link including a first beam pair between the UE and the base station, transmitting, to the base station, side information different from and in addition to the indication of the value of the channel quality information, and receiving, in response to the transmitted indication of the value and the transmitted side information, an indication of resources for the UE to use to communicate on the wireless link.

An apparatus for wireless communications is described. The apparatus may include a processor, memory in electronic communication with the processor, and instructions stored in the memory. The instructions may be executable by the processor to cause the apparatus to transmit, to a base station, an indication of a value of a channel quality parameter of a wireless link including a first beam pair between the apparatus and the base station, transmit, to the base station, side information different from and in addition to the indication of the value of the channel quality information, and receive, in response to the transmitted indication of the value and the transmitted side information, an indication of resources for the apparatus to use to communicate on the wireless link.

Another apparatus for wireless communications is described. The apparatus may include means for transmitting, to a base station, an indication of a value of a channel quality parameter of a wireless link including a first beam pair between the apparatus and the base station, means for transmitting, to the base station, side information different from and in addition to the indication of the value of the channel quality information, and means for receiving, in response to the transmitted indication of the value and the transmitted side information, an indication of resources for the apparatus to use to communicate on the wireless link.

A non-transitory computer-readable medium storing code for wireless communications at a UE is described. The code may include instructions executable by a processor to transmit, to a base station, an indication of a value of a channel quality parameter of a wireless link including a first beam pair between the UE and the base station, transmit, to the base station, side information different from and in addition to the indication of the value of the channel quality information, and receive, in response to the transmitted indication of the value and the transmitted side information, an indication of resources for the UE to use to communicate on the wireless link.

In some examples of the method, apparatuses, and non-transitory computer-readable medium described herein, receiving the indication of resources may include operations, features, means, or instructions for receiving a request to switch from using the first beam pair to using a second beam pair, the second beam pair including a different transmit beam, or a different receive beam, or a combination thereof, than the first beam pair.

In some examples of the method, apparatuses, and non-transitory computer-readable medium described herein, transmitting the side information may include operations, features, means, or instructions for identifying an event trigger may have occurred, and transmitting the side information to the base station at least in part in response to the identified event trigger.

Some examples of the method, apparatuses, and non-transitory computer-readable medium described herein may further include operations, features, means, or instructions for receiving, from the base station, an indication of a future value of the channel quality parameter of the wireless link, comparing the indicated future value to an actual value of the channel quality parameter, and transmitting, to the base station, a report identifying a result of the comparing.

In some examples of the method, apparatuses, and non-transitory computer-readable medium described herein, the base station determined the future value based on the transmitted side information and the transmitted indication of the value.

Some examples of the method, apparatuses, and non-transitory computer-readable medium described herein may further include operations, features, means, or instructions for determining, based on the comparing, that a difference between the indicated future value and the value may be greater than or equal to a threshold value, the report transmitted in response to the determining.

Some examples of the method, apparatuses, and non-transitory computer-readable medium described herein may further include operations, features, means, or instructions for receiving, from the base station, a request for the UE to transmit the report, the report transmitted by the UE in response to the received request.

Some examples of the method, apparatuses, and non-transitory computer-readable medium described herein may further include operations, features, means, or instructions for determining, by the UE, an updated value for the channel quality parameter based on the comparing, the report including the updated value.

Some examples of the method, apparatuses, and non-transitory computer-readable medium described herein may further include operations, features, means, or instructions for measuring, by the UE, the channel quality parameter for the wireless link to determine the actual value of the channel quality parameter.

Some examples of the method, apparatuses, and non-transitory computer-readable medium described herein may further include operations, features, means, or instructions for receiving, from the base station, an indication of a future value of the channel quality parameter of the wireless link determined by the base station, comparing the indicated future value to an actual value of the channel quality parameter, and refraining from transmitting, to the base station, a report identifying a result of the comparing based on determining that a difference between the indicated future value and the actual value may be less than or equal to a threshold value.

Some examples of the method, apparatuses, and non-transitory computer-readable medium described herein may further include operations, features, means, or instructions for identifying an algorithm used by the base station to determine a future value of the channel quality parameter of the wireless link, the algorithm dependent on one or more parameters, determining, by the UE, a recommended value for a parameter of the one or more parameters, and transmitting an indication of the recommended value to the base station.

In some examples of the method, apparatuses, and non-transitory computer-readable medium described herein, receiving the indication of resources may include operations, features, means, or instructions for receiving a grant of the resources in response to the transmitted indication of the value and the transmitted side information.

In some examples of the method, apparatuses, and non-transitory computer-readable medium described herein, the side information includes UE mobility information, or a Doppler spread, or an indication of past receive beam changes by the UE, or a combination thereof.

Some examples of the method, apparatuses, and non-transitory computer-readable medium described herein may further include operations, features, means, or instructions for identifying a time stamp for the value of the channel quality parameter, where the transmitted side information indicates the identified time stamp.

Some examples of the method, apparatuses, and non-transitory computer-readable medium described herein may further include operations, features, means, or instructions for measuring the value of the channel quality parameter, where the value of the channel quality parameter includes the measured value.

In some examples of the method, apparatuses, and non-transitory computer-readable medium described herein, the side information includes a time stamp for the measuring of the value.

In some examples of the method, apparatuses, and non-transitory computer-readable medium described herein, the side information further includes an indication of a duration for which the side information may be valid.

In some examples of the method, apparatuses, and non-transitory computer-readable medium described herein, the channel quality parameter of the wireless link includes a reference signal received power (RSRP), or a signal to noise ratio (SNR), or a channel quality indicator (CQI), or rank indicator (RI), or a precoding matrix indicator (PMI), or a combination thereof.

In some examples of the method, apparatuses, and non-transitory computer-readable medium described herein, the first beam pair may include operations, features, means, or instructions for a transmit beam of the base station and a receive beam of the UE, or a receive beam of the base station and a transmit beam of the UE, or a combination thereof.

A method of wireless communications at a base station is described. The method may include receiving, from a UE, an indication of a value of a channel quality parameter of a wireless link including a first beam pair between the UE and the base station, receiving, from the UE, side information different from and in addition to the indication of the value of the channel quality information, determining, based on the value of the channel quality parameter and the received side information, a future value of the channel quality parameter, determining, based on the determined future value of the channel quality parameter, resources for the UE to use to communicate with the base station on the wireless link, and transmitting, to the UE, an indication of the determined resources.

An apparatus for wireless communications is described. The apparatus may include a processor, memory in electronic communication with the processor, and instructions stored in the memory. The instructions may be executable by the processor to cause the apparatus to receive, from a UE, an indication of a value of a channel quality parameter of a wireless link including a first beam pair between the UE and the apparatus, receive, from the UE, side information different from and in addition to the indication of the value of the channel quality information, determine, based on the value of the channel quality parameter and the received side information, a future value of the channel quality parameter, determine, based on the determined future value of the channel quality parameter, resources for the UE to use to communicate with the apparatus on the wireless link, and transmit, to the UE, an indication of the determined resources.

Another apparatus for wireless communications at a base station is described. The apparatus may include means for receiving, from a UE, an indication of a value of a channel quality parameter of a wireless link including a first beam pair between the UE and the apparatus, means for receiving, from the UE, side information different from and in addition to the indication of the value of the channel quality information, means for determining, based on the value of the channel quality parameter and the received side information, a future value of the channel quality parameter, means for determining, based on the determined future value of the channel quality parameter, resources for the UE to use to communicate with the apparatus on the wireless link, and transmitting, to the UE, an indication of the determined resources.

A non-transitory computer-readable medium storing code for wireless communications at a base station is described. The code may include instructions executable by a processor to receive, from a UE, an indication of a value of a channel quality parameter of a wireless link including a first beam pair between the UE and the base station, receive, from the UE, side information different from and in addition to the indication of the value of the channel quality information, determine, based on the value of the channel quality parameter and the received side information, a future value of the channel quality parameter, determine, based on the determined future value of the channel quality parameter, resources for the UE to use to communicate with the base station on the wireless link, and transmit, to the UE, an indication of the determined resources.

In some examples of the method, apparatuses, and non-transitory computer-readable medium described herein, determining the future value of the channel quality parameter may include operations, features, means, or instructions for determining the future value of the channel quality parameter from the received value using a linear filter based on the received side information.

In some examples of the method, apparatuses, and non-transitory computer-readable medium described herein, transmitting the indication of resources may include operations, features, means, or instructions for transmitting a request for the UE to switch from using the first beam pair to using a second beam pair, the second beam pair including a different transmit beam, or a different receive beam, or a combination thereof, than the first beam pair.

Some examples of the method, apparatuses, and non-transitory computer-readable medium described herein may further include operations, features, means, or instructions for transmitting, to the UE, an indication of the determined future value, and receiving, from the UE, a report identifying a result of a comparison of the indicated future value to an actual value of the channel quality parameter.

Some examples of the method, apparatuses, and non-transitory computer-readable medium described herein may further include operations, features, means, or instructions for transmitting, to the UE, a request for the UE to transmit the report, the report transmitted by the UE in response to the request.

In some examples of the method, apparatuses, and non-transitory computer-readable medium described herein, transmitting the indication of resources may include operations, features, means, or instructions for transmitting, to the UE, a grant identifying the determined resources.

Some examples of the method, apparatuses, and non-transitory computer-readable medium described herein may further include operations, features, means, or instructions for receiving, from the UE, an indication of a recommended value for one or more parameters associated with an algorithm used by the base station to determine the future value of the channel quality parameter.

In some examples of the method, apparatuses, and non-transitory computer-readable medium described herein, the side information includes UE mobility information, or a Doppler spread, or an indication of past receive beam changes by the UE, or a combination thereof.

Some examples of the method, apparatuses, and non-transitory computer-readable medium described herein may further include operations, features, means, or instructions for identifying a timing associated with the value of the channel quality parameter.

In some examples of the method, apparatuses, and non-transitory computer-readable medium described herein, identifying the timing may include operations, features, means, or instructions for identifying a time stamp for the value of the channel quality parameter in the side information received from the UE.

In some examples of the method, apparatuses, and non-transitory computer-readable medium described herein, identifying the timing may include operations, features, means, or instructions for identifying, by the base station, the timing associated with the value of the channel quality parameter based on a measurement configuration of the UE known to the base station.

In some examples of the method, apparatuses, and non-transitory computer-readable medium described herein, the time stamp indicates a time at which the UE measured the value of the channel quality parameter.

In some examples of the method, apparatuses, and non-transitory computer-readable medium described herein, the side information further includes an indication of a duration for which the side information may be valid.

In some examples of the method, apparatuses, and non-transitory computer-readable medium described herein, the channel quality parameter of the wireless link includes an RSRP, or an SNR, or a CQI, or an RI, or a PMI, or a combination thereof.

In some examples of the method, apparatuses, and non-transitory computer-readable medium described herein, the first beam pair may include operations, features, means, or instructions for a transmit beam of the base station and a receive beam of the UE, or, a receive beam of the base station and a transmit beam of the UE, or a combination thereof.

DETAILED DESCRIPTION

Figure 1:
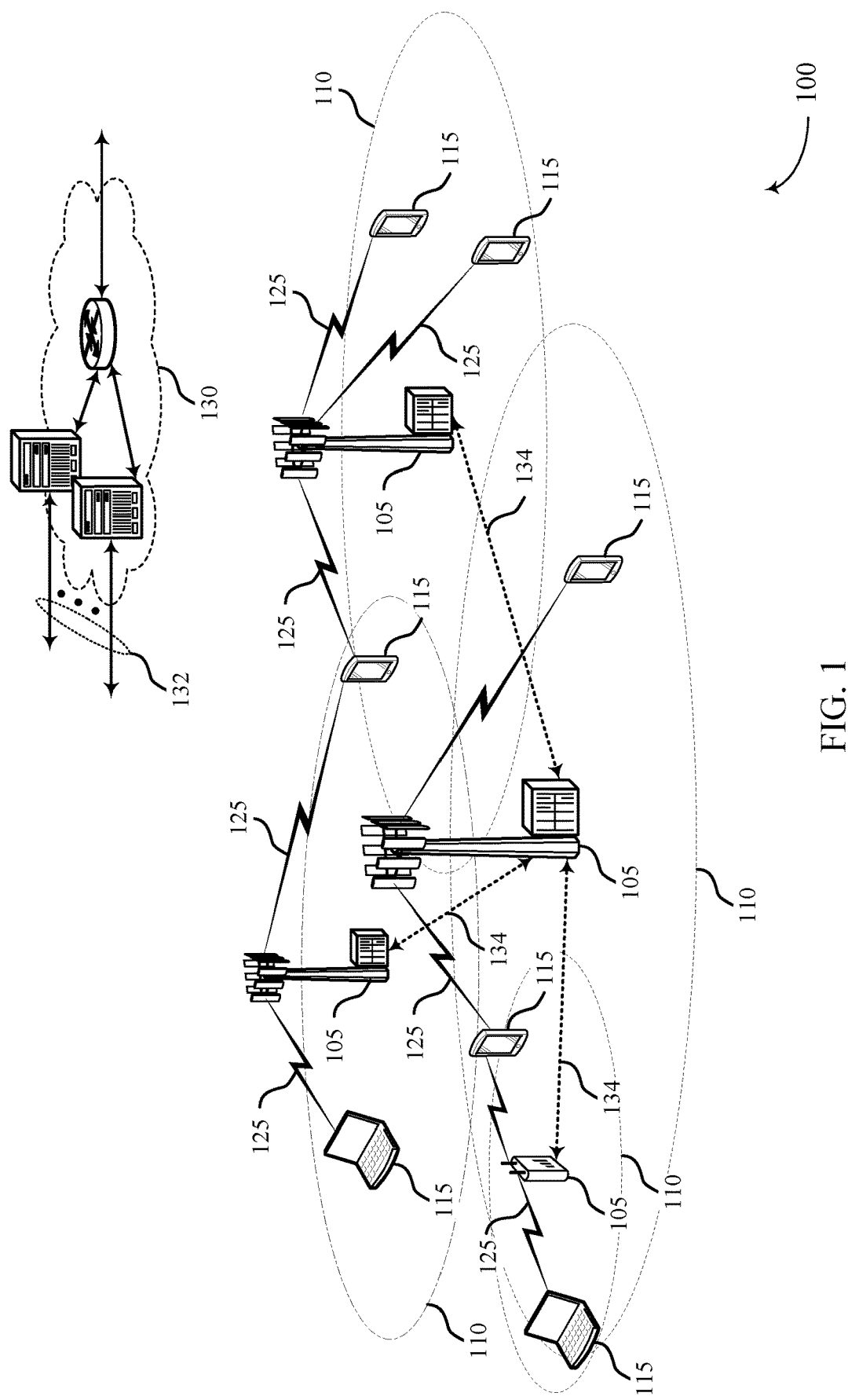
FIGS. 1 and 2 illustrate examples of a wireless communications system that supports beam management using channel state information prediction in accordance with aspects of the present disclosure.

A base station (e.g., eNodeB (eNB), a next-generation NodeB or giga-NodeB (either of which may be referred to as a gNB)) and a user equipment (UE) may perform a beam management procedure such as a beam switch procedure or a beam failure recovery procedure. In an example beam switch procedure, a base station may configure one or more reference signals. A subset of the configured reference signals may be used by the UE to monitor downlink and uplink control channels or data channels, while another subset may be used to identify candidate beams (e.g., satisfying a threshold). For example, a UE may monitor a reference signal, for example, a channel state information reference signal (CSI-RS). The UE may measure a signal quality of the configured reference signals (e.g., based on the CSI-RS) and may transmit a report of the signal quality to the base station. The signal quality may be indicated by a signal to noise ratio (SNR), a reference signal received power (RSRP), a channel quality indicator (CQI), a rank indicator (RI), or a precoding matrix indicator (PMI), etc.

Based on the report, the base station may transmit a beam switch message to the UE on a physical downlink control channel (PDCCH), a medium access control (MAC) control element (CE), radio resource control (RRC) signaling, or a combination thereof. Upon receiving the beam switch message, the base station and the UE may establish communication over the newly indicated beam. Alternatively, in an example beam failure recovery procedure, the UE may identify a link issue (e.g., a metric of a communication beam may be below a threshold).

Although present beam management procedures such as a beam switch procedure and a beam failure recovery procedure assist in easing communication link problems, these beam management procedures are reactionary instead of proactive. In addition, beam management procedures such as beam failure recovery procedures necessitate a certain delay (e.g., out of service time for the UE), dedicated resources (e.g., time and frequency resources (e.g., random access channel (RACH) resources)) for reporting beam issues, and the like. That is, communication between the base station and the UE may be disconnected when recovering from a beam issue (e.g., a beam failure event) using present beam management procedures. In addition, large amounts of resources (e.g., contention-free (CF) based RACH resources) may be reserved for a beam failure recovery procedure. Therefore, it may be desirable for the base station and the UE to solve challenges of present beam management procedures to reduce resource overhead, power consumption, or latency at the base station and the UE.

The techniques described herein may forecast a beam event using a learning algorithm, which may apply one or more parameters, such as a measured channel quality parameters or additional information (also referred to herein as side information), or a combination thereof. This may enable the base station and the UE to proactively change resources or switch active beams in advance of a beam event (e.g., a beam failure event). For example, a UE may transmit, to a base station, an indication of a value of a channel quality parameter of a wireless link including a beam pair between the UE and the base station, and transmit, to the base station, side information different from and in addition to the indication of the value of the channel quality information. The base station may receive the channel quality parameter and the side information from the UE, and determine a future value of the channel quality parameter. In response, the base station may determine resources (e.g., a beam switch) for the UE to use to communicate with the base station on the wireless link. As a result, the UE and the base station may experience reduced occurrences of beam failure recovery, as well as improved operations characteristics (e.g., reduced overhead signaling, decreased communications latency).

Aspects of the disclosure are initially described in the context of a wireless communications system. Aspects of the disclosure are further illustrated by and described with reference to diagrams, schemes, and process flows that relate to channel state information prediction. Aspects of the disclosure are further illustrated by and described with reference to apparatus diagrams, system diagrams, and flowcharts that relate to channel state information prediction.

FIG. 1 illustrates an example of a wireless communications system 100 that supports beam management using channel state information prediction in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI).

In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may receive, from a UE 115, an indication of a value of a channel quality parameter of a wireless link including a first beam pair between the UE 115 and the base station 105. The base station 105 may determine, based on the value of the channel quality parameter and the received side information, a future value of the channel quality parameter, and may receive, from the UE 115, side information different from and in addition to the indication of the value of the channel quality information. The base station 105 may determine, based on the determined future value of the channel quality parameter, resources for the UE 115 to use to communicate on the wireless link, and the base station 105 may transmit, to the UE 115, an indication of the determined resources.

A UE 115 may transmit, to a base station 105, an indication of a value of a channel quality parameter of a wireless link including a first beam pair between the UE 115 and the base station 105, transmit, to the base station 105, side information different from and in addition to the indication of the value of the channel quality information. The UE 115 may receive, in response to the transmitted indication of the value and the transmitted side information, an indication of resources for the UE 115 to use to communicate on the wireless link.

Figure 2:
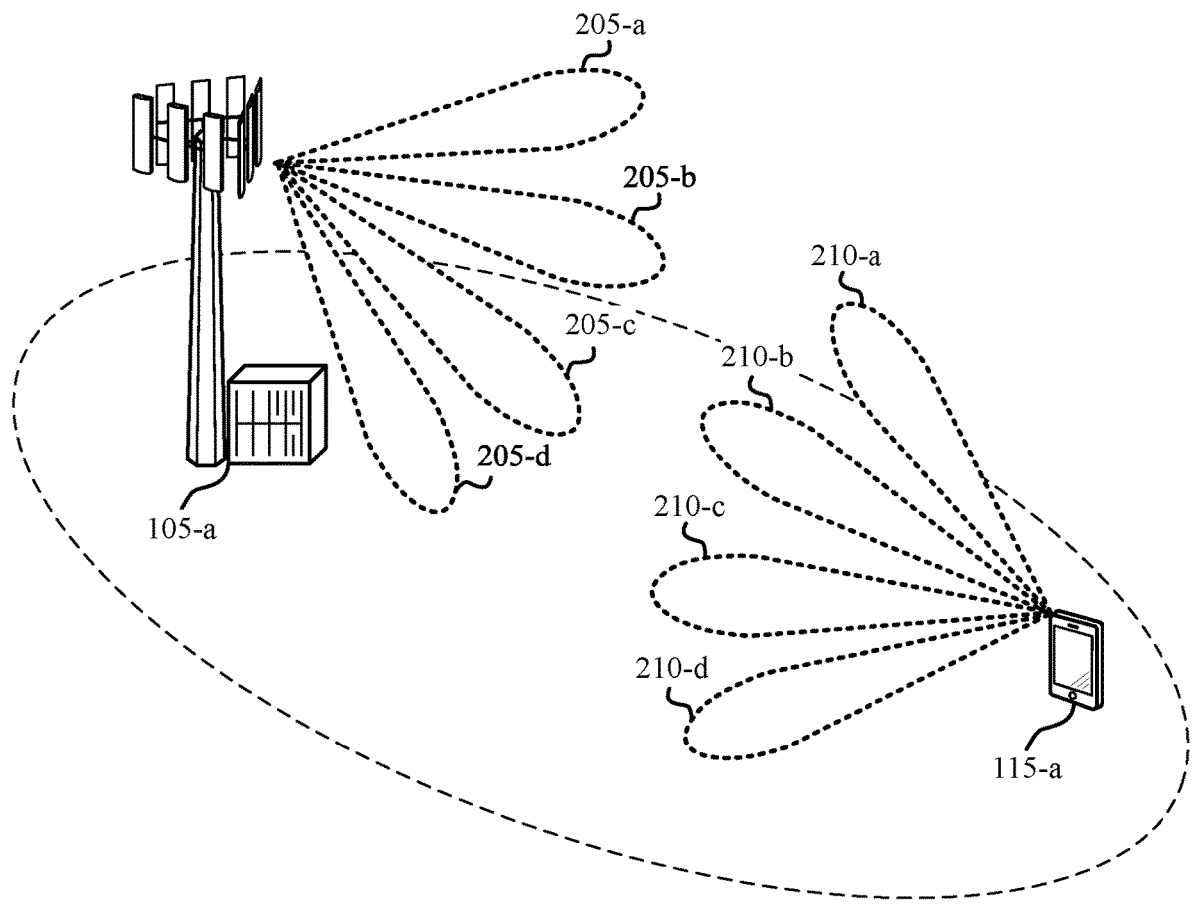

FIG. 2 illustrates an example of a wireless communications system 200 that supports beam management using channel state information prediction in accordance with aspects of the present disclosure. In some examples, the wireless communications system 200 may implement aspects of the wireless communications system 100. For example, the wireless communications system 200 may include a base station 105-a and a UE 115-a, which may be examples of the corresponding devices described with reference to FIG. 1. Some examples of the wireless communications system 200 may support an improved beam management procedure, such as a beam switch procedure, which may improve wireless communications and reduce overhead and latency in the wireless communications system 200.

The base station 105-a may perform a connection procedure (e.g., a radio resource control procedure, such as a cell acquisition procedure, a random-access procedure, a radio resource control connection procedure, a radio resource control configuration procedure) with the UE 115-a. For example, the base station 105-a and the UE 115-a may perform a connection procedure to establish a connection for communication (e.g., a wireless communication). In other examples, the base station 105-a and the UE 115-a may perform a connection procedure to re-establish a connection after a connection failure (e.g., a radio-link failure) with the base station 105-a, or to establish a connection for handover to another base station, or the like. The base station 105-a and the UE 115-a may also support multiple radio access technologies including 4G systems such as LTE systems, LTE-A systems, or LTE-A Pro systems, and 5G systems which may be referred to as NR systems.

The connection procedure between the base station 105-a and the UE 115-a may correspond to, for example, at least one of the example radio access technologies discussed herein. By way of example, in FIG. 2, a connection procedure may be related to mmW NR systems, in which the base station 105-a and the UE 115-a may operate in mmW frequency ranges (e.g., 28 GHz, 40 GHz, 60 GHz). Communication between the base station 105-a and the UE 115-a at these frequencies may be beamformed. Thus, as part of the connection procedure, the base station 105-a and the UE 115-a may perform a beam sweep to determine a suitable beam pair (e.g., uplink and downlink beam pair) for communication between the base station 105-a and the UE 115-a.

In determining a suitable beam pair, the base station 105-a and the UE 115-a may transmit one or more beamformed communication beams in different directions within a coverage area (e.g., at variable beam widths, at different elevation angles). As illustrated, the base station 105-a may transmit beams 205-a through 205-d according to a beam sweep pattern, and the UE 115-a may also transmit beams 210-a through 210-d according to a same or different beam sweep pattern. In an example, the beams 205-a through 205-d of the UE 115-a may be transmit or receive beams, and the beams 210-a through 210-d of the base station 105-a may be transmit or receive beams, or a combination thereof. In some examples, the beamformed communication beams (e.g., the beams 205-a through 205-d of the base station 105-a, and the beams 210-a through 210-d of the UE 115-a) may include one or more signals to support the suitable beam pair determination. Examples of signals may include synchronization signals (e.g., a primary synchronization signal, a secondary synchronization signal, and the like) or reference signals (e.g., a channel state information reference signal (CSI-RS), a sounding reference signal (SRS), a beam reference signal (BRS), a demodulation reference signal (DMRS), or a tracking reference signal (TRS), or any combinations of such reference signals). Each beamformed communication beam may have an associated beam identifier, beam direction, beam symbols, and the like. Thus, the base station 105-a and the UE 115-a may be capable of correlating a beam identifier, a beam direction, a beam symbol, and the like to a certain beam.

The base station 105-a and the UE 115-a may each select a beam (e.g., to track beam strength, to identify emerging active beams, and the like) based in part on a channel measurement (also referred to herein as a channel quality parameter, or simply a quality) that may include various beam strength information (e.g., a reference signal received power (RSRP), a reference signal received quality (RSRQ), a signal-to-noise ratio (SNR), a signal-to-interference-plus-noise ratio (SINR), an estimated block level error rate (BLER), or the like) of one or more reference signals associated with the beamformed communication beams. For example, the base station 105-a may select the beam 205-a for communication with the UE 115-a based in part on an SNR, an RSRP, or the like, while the UE 115-a may select the beam 210a for communication with the base station 105-a based in part on an SINR, an RSRQ, or the like. In some examples, the selected beams may be referred to as active beams. The active beams selected by the base station 105-a and the UE 115-a may also have a reciprocity property. For example, a downlink beam (e.g., the beam 205-a) of the base station 105-a may have a reciprocity with an uplink beam (e.g., the beam 210-a) of the UE 115-a. After selection of the active beams, the base station 105-a and the UE 115-a may exchange information (e.g., a report) including an indication of the selected active beams, for example, via RRC signaling, a MAC control element (MAC-CE), downlink control information (DCI), or uplink control information (UCI), or the like. As a result of the active beam selection, the base station 105-a and the UE 115-a may complete the connection procedure, and hence establish a connection (e.g., a communication link) to perform wireless communications using the selected active beams.

In some examples, a quality of the established communication link (e.g., a beam pair (e.g., the beam 205-a and/or the beam 210-a)) between the base station 105-a and the UE 115-a may vary over time, for example, due to mobility of the UE 115-a, or dynamic blockages (e.g., obstructions (e.g., buildings)). By way of example, the base station 105-a may transmit a reference signal periodically or aperiodically to the UE 115-a, so that the UE 115-a may perform channel measurements to monitor a value of a channel quality parameter of the communication link between the base station 105-a and the UE 115-a. For example, the UE 115-a may determine that an RSRP of an active beam (e.g., the beam 210-a) has fallen below a threshold (e.g., below an RSRP threshold). This determination may trigger the UE 115-a to report the measurement to the base station 105-a, which may trigger the base station 105-a to perform a beam management procedure. For example, the base station 105-a may perform a beam switch procedure to switch to a new active beam (e.g., from the beam 205-a to the beam 205-b). Alternatively, the UE 115-a may transmit periodically or aperiodically a reference signal to the base station 105-a, so that the base station 105-a may perform channel measurements to monitor a value of a channel quality parameter of the communication link.

Although present beam management procedures such as beam switch procedures and beam failure recovery procedures assist in remedying communication link problems, these beam management procedures may be reactionary instead of proactive. In addition, beam management procedures, such as beam failure recovery procedures may be associated with a certain delay (e.g., out of service time for the UE 115-a), dedicated resources (e.g., time and frequency resources (e.g., RACH resources)) for reporting beam issues, and the like. That is, communication between the base station 105-a and the UE 115-a may be disconnected when recovering from a beam issue (e.g., a beam failure event) using present beam management procedures. In addition, large amounts of resources (e.g., contention-free (CF) based RACH resources) may have to be reserved for a beam failure recovery procedure. Therefore, it may be desirable for the base station 105-a and the UE 115-a to address challenges of present beam management procedures to reduce resource overhead, power consumption, or latency at the base station 105-a and the UE 115-a.

To address problems posed by present beam management procedures, the base station 105-a and the UE 115-a may support (e.g., independently or in conjunction) a proactive approach to determine (e.g., predict, forecast, estimate) a beam event, such as a beam switch event or a beam failure event, prior to an actual beam event incidence. For example, the base station 105-a and the UE 115-a may determine (e.g., predict, forecast, estimate) a value of a channel quality parameter associated with an active beam of a communication link. By doing so, the techniques described herein may increase communications efficiency at the base station 105-a (and the UE 115-a) by reducing or eliminating latencies associated with processes related to beam management procedures. In general, the techniques described herein may forecast a beam event using a learning algorithm, which may take as input one or more parameters, such as a value of a channel quality parameter or side information, or a combination thereof. This may permit the base station 105-a (and the UE 115-a) to proactively switch active beams in advance of a beam failure event to reduce frequency of having to perform a beam failure recovery procedure.

In some examples, the base station 105-a (and the UE 115-a) may select and use a learning algorithm (also referred to herein as a prediction algorithm) from a set of learning algorithms to determine a future value of a channel quality parameter of a communication link (e.g., of an active beam pair) between the base station 105-a and the UE 115-a. The learning algorithm may be a deep learning algorithm, for example, such as a deep neural network algorithm (e.g., unsupervised pre-trained neural networks, convolutional neural networks, recurrent neural networks, recursive neural networks, or the like). In some examples, the learning algorithm may be trained, and may continue learning based on actual deployment circumstances. The learning algorithm may continue training and learning from different scenarios and in some examples may be augmented with federated learning. Federated learning may allow the base station 105-a (and the UE 115-a) to collaboratively learn a shared prediction model and may distribute training data over many base stations or UEs.

In other examples, the learning algorithm may use one or more filters, for example, such as a Kalman filter, which may use a linear combination of past measurements (e.g., a past value of a channel quality parameter) to determine a future measurement (e.g., a future value of the channel quality parameter). The examples of learning algorithms described herein are a non-exhaustive list, and other learning algorithms may be supported by the base station 105-a and the UE 115-a. In some examples, the selection and usage of a learning algorithm may be defined (e.g., by a network operator) per base station or per UE. The base station 105-a and the UE 115-a may, in some examples, select and use a same or different learning algorithm to determine (e.g., predict) a future value of a channel quality parameter of a communication link (e.g., of an active beam pair) between the base station 105-a and the UE 115-a.

By way of example, the base station 105-a may transmit one or more downlink reference signals to the UE 115-a on an active beam (e.g., the beam 205-a). For example, the base station 105-a may transmit a CSI-RS or a DMRS, and the like on the beam 205-a. The UE 115-a may perform a channel measurement based on the one or more downlink reference signals. For example, the UE 115-a may measure an RSRP, an RSRQ, an SNR, or an SINR, or the like, and may report the channel measurements to the base station 105-a. The UE 115-a may additionally or alternatively transmit one or more uplink reference signals to the base station 105-a on an active beam (e.g., the beam 210-a). For example, the UE 115-a may transmit an SRS or a TRS on the beam 210-a. The base station 105-a may receive and perform a channel measurement based in part on the one or more uplink reference signals. For example, the base station 105-a may measure an RSRP, an RSRQ, an SNR, or an SINR, and report the channel measurements to the UE 115-a. As described herein, an actual value of a channel quality parameter, a value of a channel quality parameter, and/or a future value of a channel quality parameter may include an RSRP, an RSRQ, an SNR, an SINR, a channel quality indicator (CQI), a precoding matrix index (PMI), or a rank indicator (RI), or a combination thereof.

Additionally or alternatively to performing channel measurements for active beam pairs (e.g., the beam 205-a of the base station 105-a or the beam 210-a of the UE 115-a), the channel measurements may be performed for other beams that may be referred to as candidate active beams (e.g., the beams 205-*b* through 205-*d* of the base station 105-*a*, and the beams 210-*b* through 210-*d* of the UE 115-*a*). A candidate active beam may be a fallback beam in case an active beam has fallen below a threshold (e.g., RSRP threshold, RSRQ threshold). The base station 105-*a* or the UE 115-*a*, or both, may switch to a candidate active beam, which in this case may become the active beam. The base station 105-*a* and the UE 115-*a* may use a similar approach (e.g., a learning algorithm) so that a candidate active beam itself is not prone to a beam failure event within a threshold period. For example, the base station 105-*a* and the UE 115-*a* may select a candidate active beam that may remain above a threshold (e.g., RSRP threshold, RSRQ threshold) for at least a duration (e.g., one or more slots) after a beam switch event. The duration may be set by the base station 105-*a* (and the UE 115-*a*). Thus, the base station 105-*a* (and the UE 115-*a*) may avoid switching to a candidate active beam that may result in a beam failure event prior to the duration lapsing. The channel measurements associated with the candidate active beams may also be reported together or separately with the active beam channel measurements.

The report may be a channel state information report, which may be an indication to the base station 105-*a* and the UE 115-*a* how good or bad the channel is at a specific time (e.g., based on the quality of the communication link between the base station 105-*a* and the UE 115-*a*). In some examples, the channel state information report may include a CQI, a PMI, or an RI, or a combination thereof. Transmission of the channel state information report may also be configurable. For example, the UE 115-*a* may be configured to transmit a channel state information report periodically or aperiodically. In periodic channel state information reporting, the UE 115-*a* may transmit a channel state information report in certain periodic intervals that may be configured by higher layer (e.g., via RRC signaling). In aperiodic channel state information reporting, the UE 115-*a* may transmit a channel state information report when the base station 105-*a* requests it. For example, the base station 105-*a* may request a channel state information report from the UE 115-*a* by signaling the request in a control message (e.g., a DCI). In some examples, the UE 115-*a* may identify and indicate a time stamp for one or more values of a channel quality parameter. The time stamp may identify a timing of the measurements performed to determine the one or more values of the channel quality parameter.

The base station 105-*a* may use the report (e.g., channel state information feedback) associated with the downlink reference signals and channel measurements based in part on the one or more uplink reference signals to determine a future value of a channel quality parameter. For example, the base station 105-*a* may apply the reported channel measurements (e.g., a current value of a channel quality parameter) from the channel state information report received from the UE 115-*a* to a learning algorithm, as well as the channel measurements (e.g., a value of a channel quality parameter) the base station 105-*a* measured from the one or more uplink reference signals to determine a future value of a channel quality parameter of the communication link between the base station 105-*a* and the UE 115-*a*.

A propagation path between the base station 105-*a* and the UE 115-*a* from simple line-of-sight (LOS) may be severely blocked by buildings, mountains, and tunnels, which may result in shadowing effect and fast-fading. Therefore, different channel environments or velocity may have great influence on the channel measurements (e.g., on RSRP and RSRQ). To improve the accuracy of the learning algorithm, the base station 105-*a* may receive (and request) side information from the UE 115-*a*. The base station 105-*a* may use dedicated signaling (e.g., via RRC signaling) or dynamic signaling (e.g., via DCI signaling) to request the side information from the UE 115-*a*. The base station 105-*a* may use the side information to calibrate (or update) the learning algorithm.

In an example, the base station 105-*a* may transmit a message (e.g., a control message via RRC signaling or DCI signaling) requesting side information from the UE 115-*a*. The side information may include mobility information for the UE 115-*a*, a doppler spread of the UE 115-*a*, previous beam switching events at the UE 115-*a*, or the like. For example, the UE 115-*a* may measure a doppler spread based in part on sensor measurements of the UE 115-*a* measuring speed or velocity using one or more reference signals (e.g., one or more TRSs). The UE 115-*a* may also perform a time average over past channel measurements associated with RSRP (e.g., using L3-RSRP filtering) of one or more reference signals (e.g., TRS) to improve the accuracy of the RSRP measurement. In some examples, the mobility information of the UE 115-*a* may include a speed or a velocity of the UE 115-*a* within a coverage area of the base station 105-*a*. The side information may also include information, for example, such as a predicted speed of the UE 115-*a* at a future time period. The predicted information, as listed herein, may be determined by the UE 115-*a* also a using a learning algorithm.

The message may, in some examples, include an indication of a learning algorithm used by the base station 105-*a*. For example, the UE 115-*a* may identify that the base station 105-*a* is using a linear filter as the learning algorithm to determine a future value of a channel quality parameter. Here, the UE 115-*a* may provide one or more parameters of the linear filter to the base station 105-*a*, based in part on channel measurements (e.g., a doppler spread measurement) by the UE 115-*a*. Thus, the one or more parameters of the linear filter may be part of the side information that the UE 115-*a* provides to the base station 105-*a*. Additionally, the message may include a second indication of the future value of a channel quality parameter determined by the base station 105-*a*. Alternatively, the UE 115-*a* may be unaware of the learning algorithm being used by the base station 105-*a*, and instead the UE 115-*a* may exclusively receive an indication of the future value of the channel quality parameter determined by the base station 105-*a*. In some examples, the base station 105-*a* may request, in the same message or in a different message, feedback (e.g., an error report) about the future value of the channel quality parameter. The feedback request may also include timing information for when the UE 115-*a* is to transmit feedback to the base station 105-*a*.

To provide feedback, the UE 115-*a* may perform channel measurements on one or more downlink reference signals, as discussed herein, to determine one or more metrics (e.g., RSRP, RSRQ) and report the measured channel measurements, as well as the side information to the base station 105-*a*. In some examples, the UE 115-*a* may determine an error between the future value of the channel quality parameter determined by the base station 105-*a* and the measured channel measurements (e.g., an actual value of the channel quality parameter) by the UE 115-*a*. The error reporting may be trigger-based, for example, the UE 115-*a* may report the error when the error is above a threshold. For example, the UE 115-*a* may determine that a difference between the indicated future value and the actual value (measured by the UE 115-*a*) is greater than or equal to a threshold value. The UE 115-*a* may transmit the error report collectively or separately with the side information. The UE 115-*a* may also include a timing parameter, for example, a valid time duration for the feedback. For example, the timing parameter may indicate to the base station 105-*a* that the side information may be valid for a certain period from the reporting time (e.g., 20 ms from the time the base station 105-*a* receives the report from the UE 115-*a*).

In some examples, the UE 115-*a* may identify a time stamp for the determined actual value of the channel quality parameter, where the side information or the report may indicate the identified time stamp. The UE 115-*a* may include a time stamp of the determined actual value of the channel quality parameter because, in some examples, the UE 115-*a* may be offered multiple chances to measure an active beam before given a chance to report the measurement results to the base station 105-*a*. That is, a periodicity of the base station 105-*a* transmitting one or more reference signals, and that of reporting occurrences by the UE 115-*a* may be different. Thus, to predict a future value of a channel quality parameter (e.g., RSRP), the timing of the measurement matters for the base station 105-*a*. In some examples, the UE 115-*a* may be configured to report a single value of a channel quality parameter (e.g., a single RSRP for a beam pair link). If the UE 115-*a* measures the value of the channel quality parameter (e.g., RSRP) multiple times before a reporting occurrence, the UE 115-*a* may determine how to report or which measurement value to report to the base station 105-*a*. For example, the UE 115-*a* may determine an average of the measured values of the channel quality parameter or choose to report a maximum or minimum of the measured values of the channel quality parameter. The base station 105-*a* may configure the UE 115-*a* to report all measurements of an active beam in a sequential manner, based in part on the base station 105-*a* ability to associate the measurement correctly with the reported measurement value.

The base station 105-*a* may receive the error report or the side information, or both, and may update the future value of the channel quality parameter accordingly. For example, the base station 105-*a* may apply the error report or the side information, or both to the learning algorithm to determine an updated future value of the channel quality parameter. The base station 105-*a* may then make a scheduling decision based on the updated prediction, for example, the base station 105-*a* may schedule resources and request a beam switch of an active beam (e.g., from the beam 205-*a* to the beam 205-*c*) prior to a beam failure event indicated by the updated prediction. For example, the updated prediction may indicate that a beam failure event is to occur in N slots (where N is an integer), for example, from a present slot. Thus, before the predicted beam failure event, the base station 105-*a* may perform a beam switch procedure that may include switching from communicating with the UE 115-*a* using an active beam (e.g., the beam 205-*a*) to communicating with the UE 115-*a* using a candidate active beam (e.g., the beam 205-*c*). As a result, the base station 105-*a* may not experience interruption in communication with the UE 115-*a* and may not perform a beam failure recovery procedure.

The base station 105-*a* may also transmit a beam switch message to the UE 115-*a*. The beam switch message may include beam switch timing information (e.g., time and frequency resources, slot index) and a request for the UE 115-*a* to perform a beam switch procedure, during a beam switch window, based in part on the beam switch timing information. The beam switch window may indicate a time interval when a beam switch event is scheduled to occur (e.g., during M slot, M symbols, where M is an integer). The beam switch procedure may include the UE 115-*a* switching from communicating with the base station 105-*a* using an active beam (e.g., the beam 210-*a*) to communicating with the base station 105-*a* using a candidate active beam (e.g., the beam 210-*b*). As a result, the UE 115-*a* may remove interruption in communication with the base station 105-*a* and may not perform a beam failure recovery procedure. As a result of the active beam switching, the base station 105-*a* and the UE 115-*a* may continue to communicate using the switched active beams without interruption.

The techniques described herein may increase communications efficiency between the base station 105-*a* and the UE 115-*a* by reducing or eliminating latencies associated with processes related to beam management, and more specifically for enabling the base station 105-*a* and the UE 115-*a* to proactively switch active beams in advance of a beam failure event. As a result, the base station 105-*a* and the UE 115-*a* may experience reduced number of beam failure recovery procedures.

Figure 3:
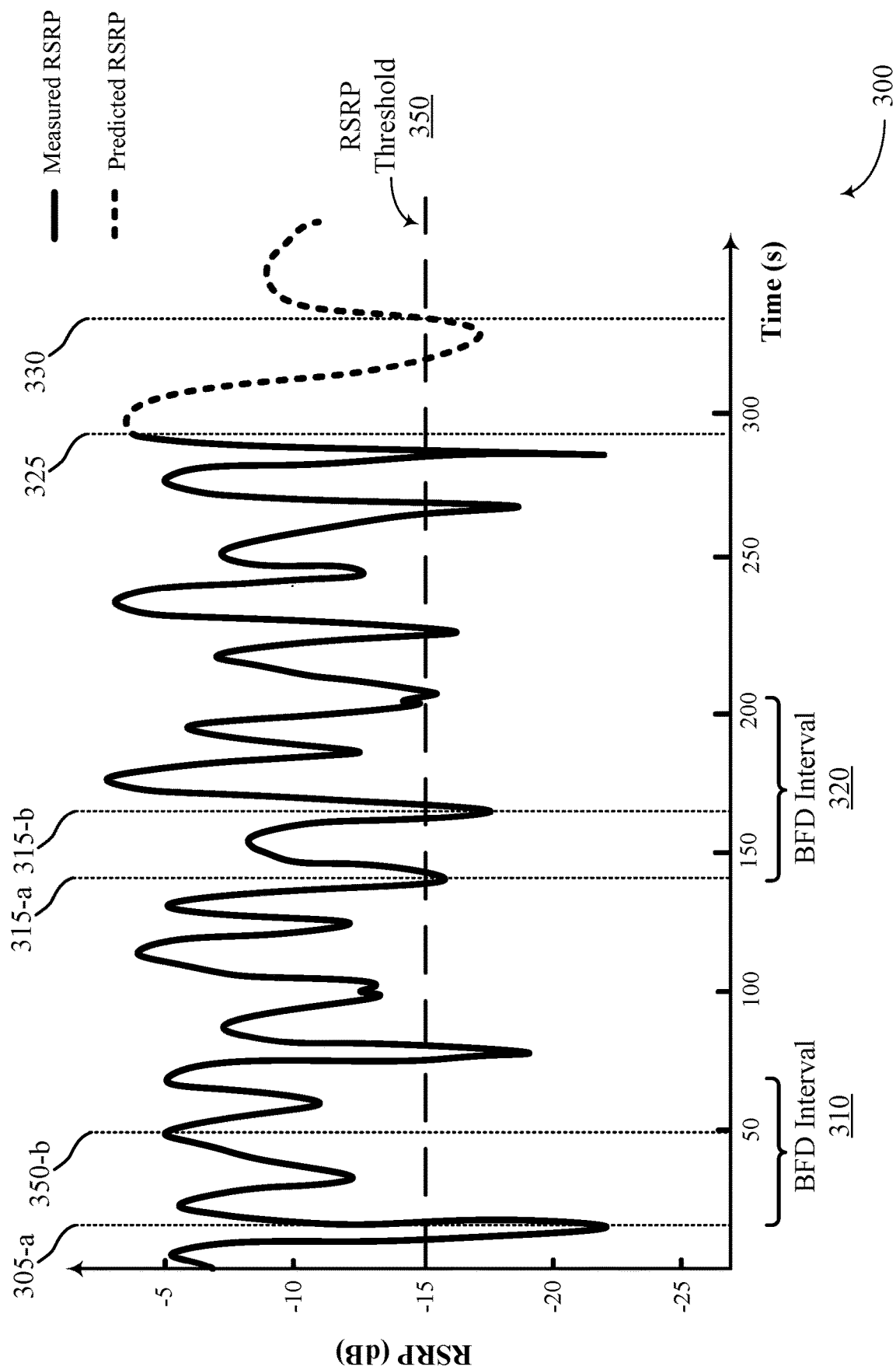
FIG. 3 illustrates an example of a proactive beam management diagram that supports beam management using channel state information prediction in accordance with aspects of the present disclosure.

FIG. 3 illustrates an example of a proactive beam management diagram 300 that supports beam management using channel state information prediction in accordance with aspects of the present disclosure. The proactive beam management diagram 300 may implement aspects of the wireless communications systems 100 and 200, such as providing improvements in beam management procedures. In some examples, the proactive beam management diagram 300 may depict a relationship between a measured and/or predicted RSRP associated with one or more reference signals over a time period (e.g., slots, TTIs). Aspects of the proactive beam management diagram 300 may be implemented by a base station 105 and/or a UE 115, which may be examples of the corresponding devices described with reference to FIGS. 1 and 2.

A base station 105 (and a UE 115) may determine a beam failure event associated with an active beam. In some examples, the base station 105 (and the UE 115) may determine multiple beam failure instances based in part on measuring one or more reference signals (e.g., a CSI-RS, an SRS, a BRS, a DMR, or a TRS, or a combination thereof) associated with the active beam. For example, the base station 105 (and the UE 115) may measure an RSRP of a reference signal (e.g., an SRS, a TRS) and may determine that the reference signal at a time instance 305-*a* is below an RSRP threshold 350 (e.g., −15 dB). Here, the base station 105 (and the UE 115) may flag a beam failure instance. In some examples, the base station 105 (and the UE 115) may start a beam failure detection interval 310 (e.g., a beam failure timer) and increment a beam failure counter based in part on each determined beam failure instance during the beam failure detection interval 310. In an example, when the beam failure detection interval 310 lapses and the base station 105 (and the UE 115) does not determine another beam failure instance, the base station 105 (and the UE 115) may reset the beam failure counter. For example, the base station 105 (and the UE 115) may measure an RSRP of the reference signal (e.g., an SRS, a TRS) at a time instance 305-*b*, and determine that the reference signal at the time instance 305-*b* is above the RSRP threshold 350 (e.g., −15 dB). Thus, the base station 105 (and the UE 115) may refrain from incrementing the beam failure counter. Once the beam failure detection interval 310 lapses, the base station 105 (and the UE 115) may determine whether the beam failure counter meets a threshold. If the beam failure counter satisfies the threshold, the base station 105 (and the UE 115) may declare a beam failure. Otherwise, the base station 105

(and the UE 115) may continue to operate using the active beams and monitoring the channel conditions.

In another example, the base station 105 (and the UE 115) may measure an RSRP of the reference signal (e.g., an SRS, a TRS) at a time instance 315-a, and determine that the reference signal is below an RSRP threshold 350 (e.g., −15 dB). Here, the base station 105 (and the UE 115) may flag a beam failure instance. The base station 105 (and the UE 115) may also start a beam failure detection interval 320 (e.g., a beam failure timer) and may increment a beam failure counter based in part on each determined beam failure instance during the beam failure detection interval 320. During the beam failure detection interval 320, the base station 105 (and the UE 115) may yet again measure an RSRP of the reference signal at a time instance 315-b and determine that the reference signal is also below the RSRP threshold 350 (e.g., −15 dB). Here, the base station 105 (and the UE 115) may increment the beam failure counter. In this example, the base station 105 (and the UE 115) may determine whether the beam failure counter meets a maximum beam failure threshold. If the beam failure counter does not meet the maximum beam failure threshold, the base station 105 (and the UE 115) may continue to operate using the active beam. Otherwise, if the beam failure counter meets the maximum beam failure threshold, the base station 105 (and the UE 115) may determine that a beam failure event has occurred and trigger a beam failure recovery procedure.

Although these beam management procedures (e.g., using beam failure counters) support improving communication links. These beam management procedures may be reactionary (e.g., in response to a beam misalignment or a beam failure) instead of proactive (e.g., prior to a beam misalignment or a beam failure occasion). In addition, these beam management procedures necessitate certain delay (e.g., out of service time for the UE 115), dedicated resources (e.g., time and frequency resources (e.g., RACH resources)) for reporting beam issues, added overhead signaling, and the like. Therefore, it may be desirable for the base station 105 and the UE 115 to address challenges of present beam management procedures to reduce resource overhead, power consumption, or latency at the base station 105 and the UE 115.

As discussed earlier, the base station 105 (and the UE 115) may use a proactive approach to predict a beam event, such as a beam switch event or a beam failure event prior to an actual beam event occurrence. The techniques described herein may forecast a beam event according to real-time channel measurements or past channel measurements, or a combination thereof. This may enable the base station 105 (and the UE 115) to proactively switch active beams in advance of a beam event (e.g., a beam failure event). As a result, the base station 105 (and the UE 115) may experience reduced occurrences of beam failure recovery.

By way of example, the base station 105 (and the UE 115) may use a learning algorithm to determine a future quality of a communication link (e.g., of an active beam pair) between the base station 105 and the UE 115. The learning algorithm may be a deep learning algorithm, for example, such as a deep neural network algorithm (e.g., unsupervised pre-trained neural networks, convolutional neural networks, recurrent neural networks, recursive neural networks, or the like). The base station 105-a (and the UE 115) may determine (e.g., predict, forecast, estimate) a future value of a channel quality parameter (e.g., RSRP) based in part on previous and/or present uplink reference signal measurements performed by the base station 105, previous and/or present downlink reference signal measurements performed by the UE 115, side information provided by the UE 115, or a combination thereof as described herein. For example, the base station 105 (and the UE 115) may determine at a time instance 325 that an active beam may fail at a future time (e.g., x slots, where x is a positive integer) based in part on a prediction algorithm. As illustrated in FIG. 3, the RSRP of the reference signal associated with the active beam may fall below the RSRP threshold 350. Thus, the base station 105 (and the UE 115) may proactively switch active beams in advance to reduce a beam failure event and having to perform a beam failure recovery procedure. For example, the base station 105 (and the UE 115) may transmit a beam switch message that may include beam switch timing information (e.g., time and frequency resources, symbol index, etc.) and a request for the UE 115 (and the base station 105) to perform a beam switch procedure, during a beam switch window.

The beam switch window may indicate a time interval when a beam switch event is scheduled to occur. Additionally, or alternatively, the base station 105 (and the UE 115) may determine at a time instance 330 that the active beam may remain above an RSRP threshold for at least a future duration (e.g., x slots, where x is a positive integer) based in part on the determination. In some examples, the base station 105 (and the UE 115) may proactively request to switch back to the active beams in advance to reduce effects of a beam failure event and having to perform a beam failure recovery procedure. Although FIG. 3 is described in context of an active beam, the proactive beam management diagram 300 may be related to other beams that may be referred to as candidate active beams, which may be a fallback beam in case an active beam has fallen below a threshold (e.g., RSRP threshold, RSRQ threshold).

Therefore, aspects of proactive beam management diagram 300 may provide enhancements to the operation of base stations and UEs supporting beam management using channel state information prediction, and the like. For example, by enabling base stations and UEs to use a proactive approach to predict a beam event, such as a beam switch event or a beam failure event prior to an actual beam event occurrence, operational characteristics, such as processor utilization and latency related to communications may be reduced.

Figure 4:
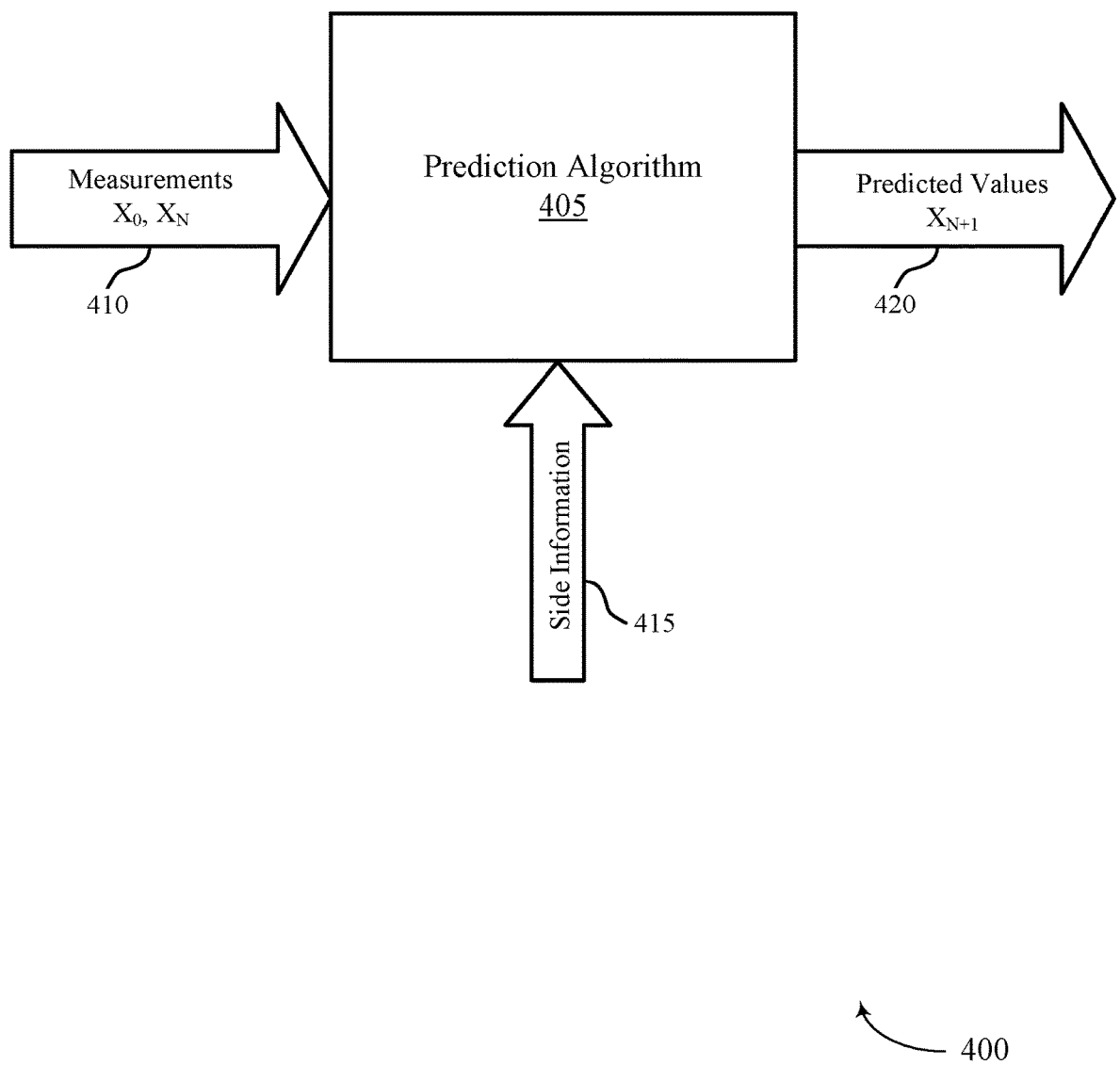
FIG. 4 illustrates an example of a proactive beam management scheme that supports beam management using channel state information prediction in accordance with aspects of the present disclosure.

FIG. 4 illustrates an example of a proactive beam management scheme 400 that supports beam management using channel state information prediction in accordance with aspects of the present disclosure. The proactive beam management scheme 400 may implement aspects of the wireless communications systems 100 and 200, such as providing improvements in beam management procedures. Aspects of the proactive beam management scheme 400 may be implemented by a base station 105 and/or a UE 115, which may be examples of the corresponding devices described with reference to FIGS. 1 and 2.

The proactive beam management scheme 400 may include a prediction algorithm 405, which may be a deep learning algorithm, for example, such as a deep neural network algorithm (e.g., unsupervised pre-trained neural networks, convolutional neural networks, recurrent neural networks, recursive neural networks, or the like). In some examples, the prediction algorithm 405 may be trained, and even after being trained the prediction algorithm 405 may continue learning based on actual deployment circumstances. In other examples, the prediction algorithm 405 may use one or more filters, for example, such as a Kalman filter, which may use a linear combination of past measurements (e.g., past channel quality measurements) to determine a future measurement (e.g., a future value of a channel quality parameter). The examples of prediction algorithms described herein are a non-exhaustive list, and other prediction algorithms may be supported by the base station 105 and the UE 115. In some examples, the selection and usage of the prediction algorithm 405 may be defined (e.g., by a network operator) per base station or per UE. The base station 105 and the UE 115 may, in some examples, select and use a same or different prediction algorithm to determine (e.g., predict) a future quality of a communication link (e.g., of an active beam pair).

The prediction algorithm 405 may predict a future value of a channel quality parameter based in part on one or more measurements 410 or side information 415, or both. The one or more measurements 410 may include a value of a channel quality parameter (e.g., RSRP, RSRQ, SNR, SINR) measured by a base station 105 or a UE 115, or both. The side information may include UE mobility information, a doppler spread, previous beam switching events, or the like. Thus, the prediction algorithm 405 may output one or more predicted values 420 (e.g., a future value), such as a future value of a channel quality parameter.

Figure 5:
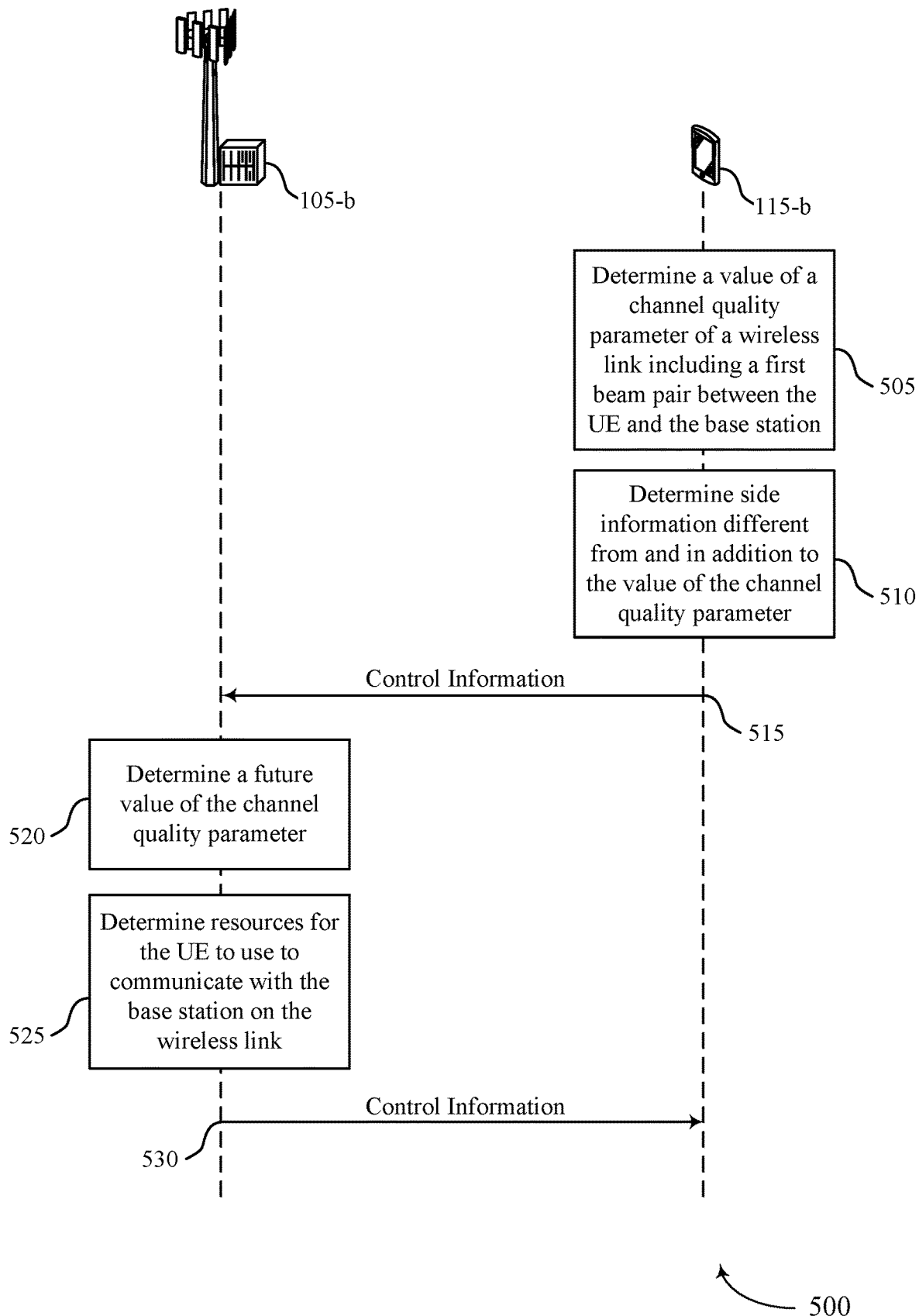
FIGS. 5 and 6 illustrate examples of a process flow that supports beam management using channel state information prediction in accordance with aspects of the present disclosure.

FIG. 5 illustrates an example of a process flow 500 that supports beam management using channel state information prediction in accordance with aspects of the present disclosure. The process flow 500 may implement aspects of the wireless communications systems 100 and 200, such as providing improvements in beam management procedures. The process flow 500 may include a base station 105-b and a UE 115-b, which may be examples of the corresponding devices described with reference to FIGS. 1 and 2. In the following description of the process flow 500, the operations between the base station 105-b and the UE 115-b may be transmitted in a different order than the exemplary order shown, or the operations performed by the base station 105-b and the UE 115-b may be performed in different orders or at different times. Certain operations may also be omitted from the process flow 500, and/or other operations may be added to the process flow 500.

At 505, the UE 115-b may determine a value of a channel quality parameter of a wireless link including a first beam pair between the UE 115-b and the base station 105-b. The first beam pair may include a transmit beam of the base station 105-b and a receive beam of the UE 115-b, or a receive beam of the base station 105-b and a transmit beam of the UE 115-b, or a combination thereof. The channel quality parameter of the wireless link may include an RSRP, or an RSRQ, or an SNR, or a CQI, or an RI, or a PMI, or a combination thereof. For example, the UE 115-a may measure an RSRP or an RSRQ of one or more reference signals (e.g., a CSI-RS, an SRS, a BRS, a DMRS, or a TRS) associated with the first beam pair and determine a channel quality parameter of the wireless link based in part on measuring the RSRP or the RSRQ of the reference signals.

At 510, the UE 115-b may determine side information different from and in addition to the value of the channel quality parameter. The side in formation may include, for example, UE 115-b mobility information, or a Doppler spread, or an indication of past receive beam changes by the UE 115-b, or a combination thereof. In some examples, the side information may include an indication of a duration for which the side information is valid.

At 515, the UE 115-b may transmit control information, via signaling (e.g., RRC signaling, UCI signaling), that may include an indication of the value of the channel quality parameter to the base station 105-b. In some examples, the UE 115-b may additionally or separately (e.g., subsequently) transmit the side information to the base station 105-b.

At 520, the base station 105-b may determine a future value of the channel quality parameter. For example, the base station 105-b may determine the future value of the channel quality parameter based in part on the received value of the channel quality parameter and the received side information. In some examples, the base station 105-b may determine the future value of the channel quality parameter from the received value using a linear filter based in part on the received side information.

At 525, the base station 105-b may determine resources for the UE 115-b to use to communicate with the base station 105-b on the wireless link. For example, the base station 105-b may determine, based in part on the determined future value of the channel quality parameter, resources for the UE 115-b to use to communicate with the base station 105-b on the wireless link. At 530, the base station 105-b may transmit control information, via signaling (e.g., RRC signaling, UCI signaling), that may include an indication of the determined resources. In some examples, the indication may be a grant identifying the determined resources. The base station 105-b may, in some examples, transmit a request for the UE 115-b to switch from using the first beam pair to using a second beam pair, the second beam pair including a different transmit beam, or a different receive beam, or a combination thereof.

The operations performed by the base station 105-b and the UE 115-b as part of, but not limited to, process flow 500 may provide enhancements in beam management. Additionally, the operations performed by the base station 105-b and the UE 115-b as part of, but not limited to, process flow 500 may provide benefits and improvements to the operation of the base station 105-b and the UE 115-b. For example, by predicting a future value of a channel quality parameter associated with beam pairs (or a single beam of the base station 105-b and/or the UE 115-b), the operational characteristics, such as power consumption, processor utilization, and memory usage related to beam management may be decreased. The operations performed by the base station 105-b and the UE 115-b as part of, but not limited to, process flow 500 may increase the communications efficiency of the base station 105-b and the UE 115-b by reducing latency and overhead signaling associated with processes related to beam management procedures, such as reducing beam failure recovery.

Figure 6:
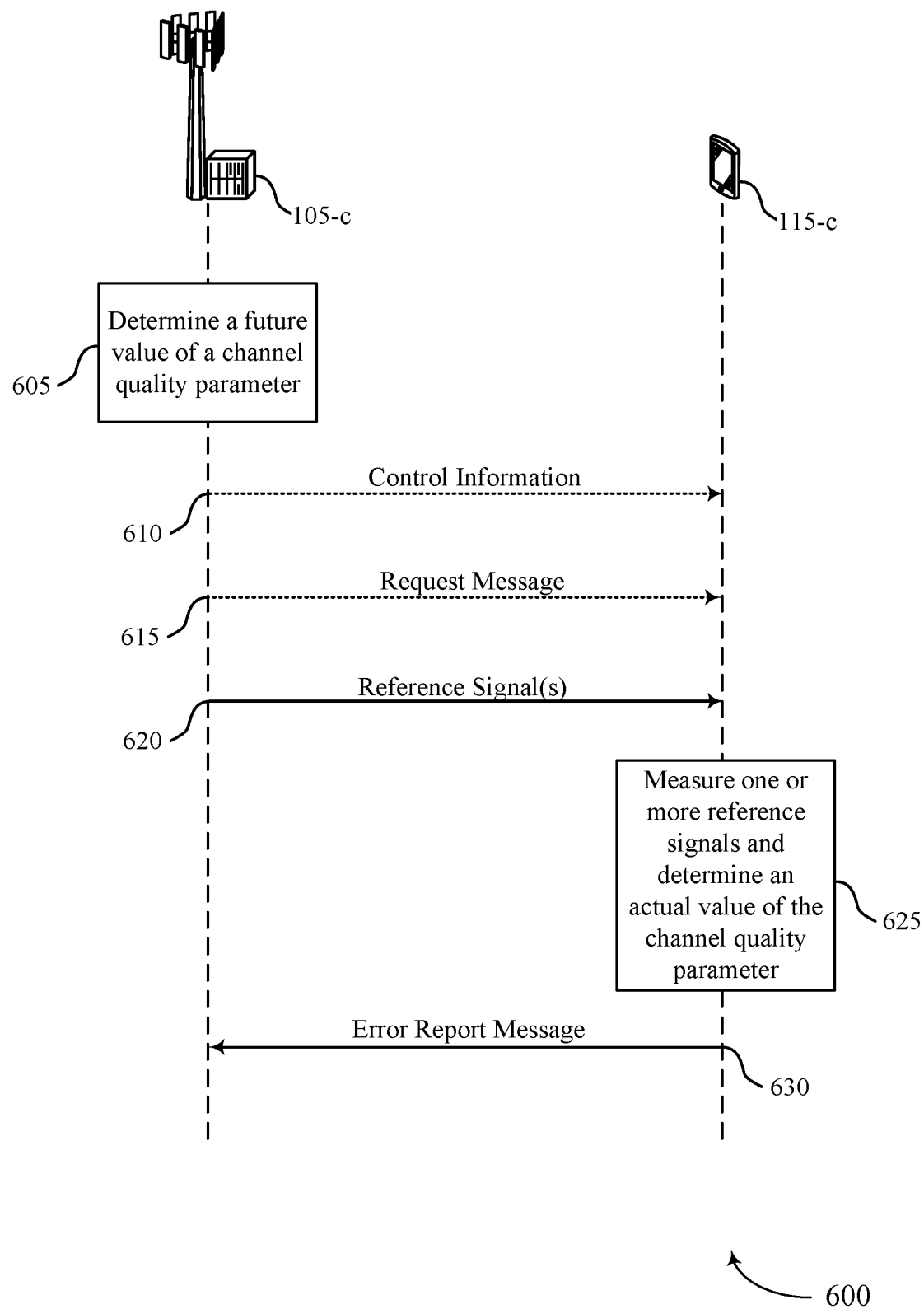

FIG. 6 illustrates an example of a process flow 600 that supports beam management using channel state information prediction in accordance with aspects of the present disclosure. The process flow 600 may implement aspects of the wireless communications systems 100 and 200, such as providing improvements in beam management procedures. The process flow 600 may include a base station 105-c and a UE 115-c, which may be examples of the corresponding devices described with reference to FIGS. 1 and 2. In the following description of the process flow 600, the operations between the base station 105-c and the UE 115-c may be transmitted in a different order than the exemplary order shown, or the operations performed by the base station 105-c and the UE 115-c may be performed in different orders or at different times. Certain operations may also be omitted from the process flow 600, and/or other operations may be added to the process flow 600.

At 605, the base station 105-c may determine a future value of a channel quality parameter. In some examples, transmission of the control information may be optional. At 610, the base station 105-c may transmit control information to the UE 115-*c*. The control information may include an indication of the determined future value of the channel quality parameter. In some examples, transmission of the request message may be optional. At 615, the base station 105-*c* may transmit a request message to the UE 115-*c*. The request message may include a request for the UE 115-*c* to provide an error report associated with the determined future value of the channel quality parameter.

At 620, the base station 105-*c* may transmit one or more reference signals (e.g., CSI-RS, TRS) to the UE 115-*c*. At 625, the UE 115-*c* may measure the one or more reference signals and determine an actual value of the channel quality parameter. At 630, the UE 115-*c* may transmit an error report message, for example, including an error report. In some examples, the error reporting may be trigger-based. For example, the UE 115-*c* may compare the indicated future value to the actual value of the channel quality parameter and transmit the error report based in part on the comparison. The UE 115-*c* may refrain from transmitting, to the base station 105-*c*, the error report identifying a result of the comparison based in part on determining that a difference between the indicated future value and the actual value is less than or equal to a threshold value. Otherwise, if the UE 115-*c* determines that the difference between the indicated future value and the current value is greater than or equal to a threshold value, the UE 115-*c* may transmit the error report. The error report message may also include one or more proposed updates of one or more parameters of a learning algorithm for the base station 105-*c*.

The operations performed by the base station 105-*c* and the UE 115-*c* as part of, but not limited to, process flow 600 may provide enhancements in beam management. Additionally, the operations performed by the base station 105-*c* and the UE 115-*c* as part of, but not limited to, process flow 600 may provide benefits and improvements to the operation of the base station 105-*c* and the UE 115-*c*. For example, by predicting a future value of a channel quality parameter associated with beam pairs (or a single beam of the base station 105-*c* and/or the UE 115-*c*), the operational characteristics, such as power consumption, processor utilization, and memory usage related to beam management may be decreased. The operations performed by the base station 105-*c* and the UE 115-*c* as part of, but not limited to, process flow 600 may also improve communications efficiency for the base station 105-*c* and the UE 115-*c* by reducing latency and overhead signaling associated with processes related to beam management procedures, such as reducing beam failure recovery.

Figure 7:
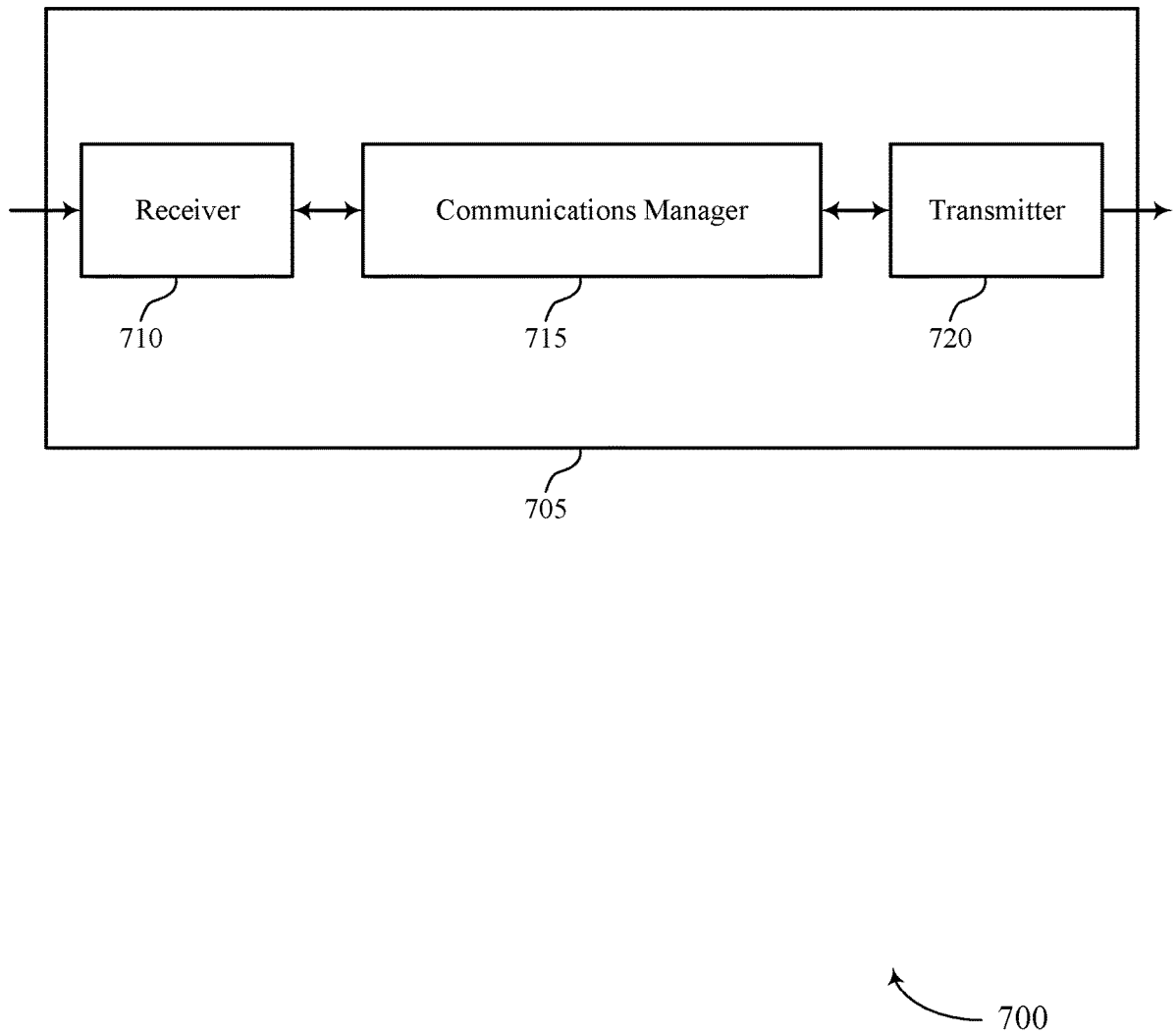
FIGS. 7 and 8 show block diagrams of devices that support beam management using channel state information prediction in accordance with aspects of the present disclosure.

FIG. 7 shows a block diagram 700 of a device 705 that supports beam management using channel state information prediction in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to beam management using channel state information prediction, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit, to a base station, an indication of a value of a channel quality parameter of a wireless link including a first beam pair between the UE and the base station, transmit, to the base station, side information different from and in addition to the indication of the value of the channel quality information, and receive, in response to the transmitted indication of the value and the transmitted side information, an indication of resources for the UE to use to communicate on the wireless link. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception.

The communications manager 715 as described herein may be implemented to realize one or more potential advantages. Various implementations may enable communications manager 715 to proactively predict a beam event (e.g., a beam failure) using a learning algorithm, which may reduce the effects of beam failure and improve communications quality. For example, at least one implementation may enable the communications manager 715 to effectively predict a beam failure event before the failure occurs (e.g., predict that a beam failure will or would otherwise occur), so that communications manager 715 may adapt accordingly.

Based on implementing the beam management techniques as described herein, one or more processors of the device 705 (e.g., processor(s) controlling or incorporated with one or more of receiver 710, communications manager 715, and transmitter 720) may experience fewer beam failure events and may perform fewer beam failure recovery operations as a result. In addition, the device 705 may have increased power savings from performing fewer beam recovery operations. The techniques herein may also be associated with improved operational characteristics, such as reduced overhead signaling and decreased communications latency.

Figure 8:
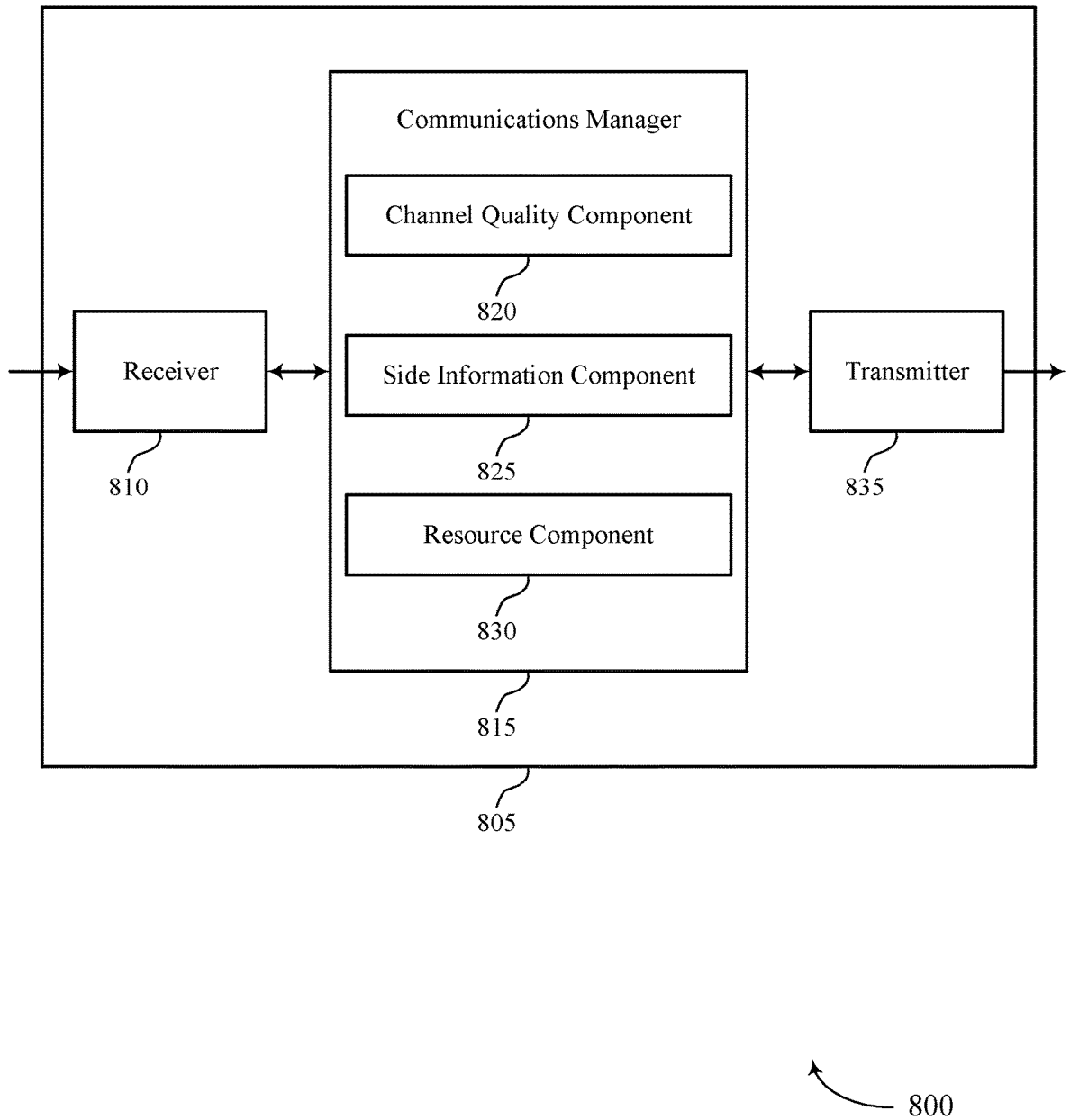

FIG. 8 shows a block diagram 800 of a device 805 that supports beam management using channel state information prediction in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to beam management using channel state information prediction, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a channel quality component 820, a side information component 825, and a resource component 830. The communications manager 815 may be an example of aspects of the communications manager 1010 described herein.

The channel quality component 820 may transmit, to a base station, an indication of a value of a channel quality parameter of a wireless link including a first beam pair between the UE and the base station. The side information component 825 may transmit, to the base station, side information different from and in addition to the indication of the value of the channel quality information. The resource component 830 may receive, in response to the transmitted indication of the value and the transmitted side information, an indication of resources for the UE to use to communicate on the wireless link.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
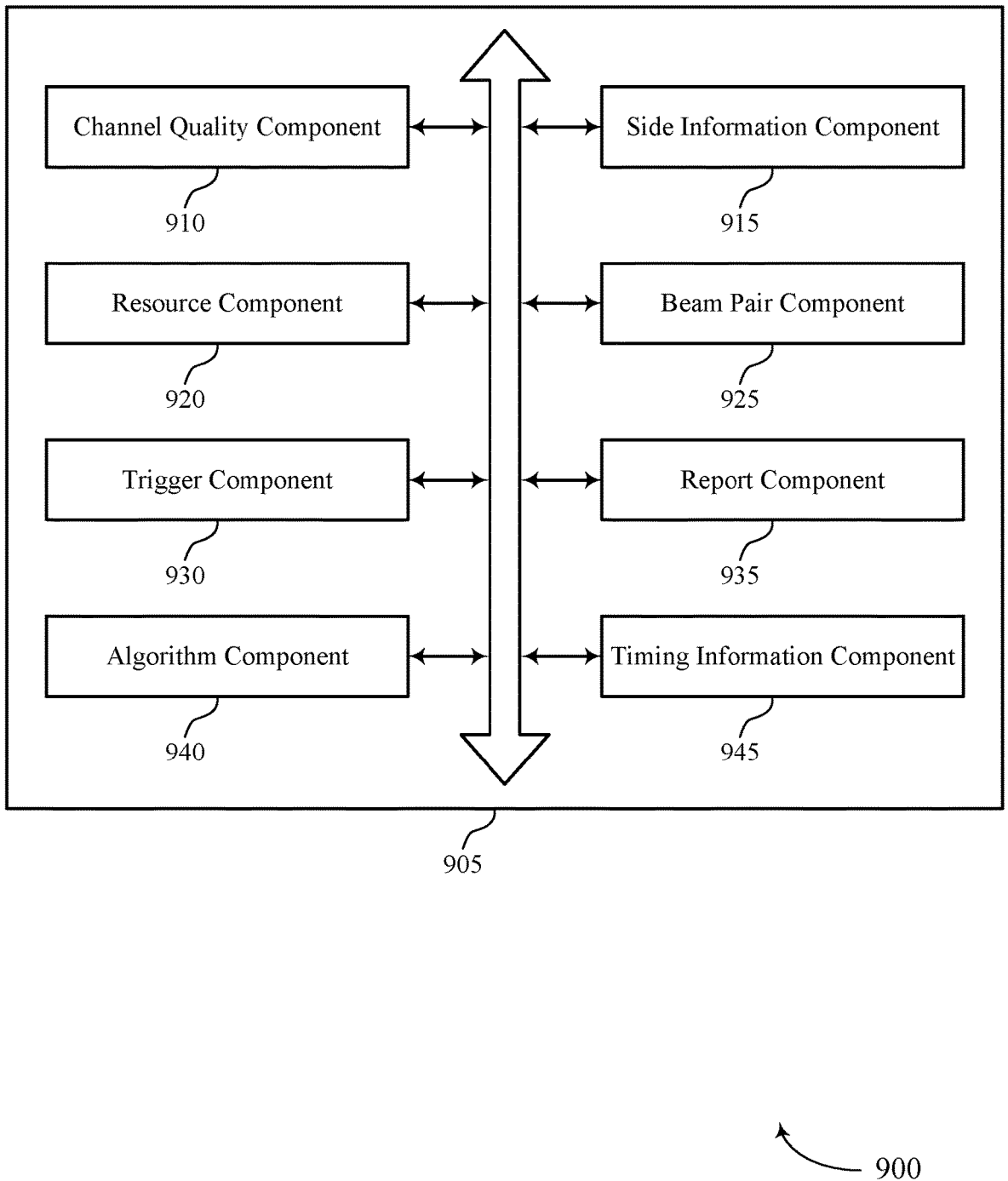
FIG. 9 shows a block diagram of a communications manager that supports beam management using channel state information prediction in accordance with aspects of the present disclosure.

FIG. 9 shows a block diagram 900 of a communications manager 905 that supports beam management using channel state information prediction in accordance with aspects of the present disclosure. The communications manager 905 may be an example of aspects of a communications manager 715, a communications manager 815, or a communications manager 1010 described herein. The communications manager 905 may include a channel quality component 910, a side information component 915, a resource component 920, a beam pair component 925, a trigger component 930, a report component 935, an algorithm component 940, and a timing information component 945. Each of these modules may communicate, directly or indirectly, with one another (e.g., via one or more buses).

The channel quality component 910 may transmit, to a base station, an indication of a value of a channel quality parameter of a wireless link including a first beam pair between the UE and the base station. In some examples, the channel quality component 910 may receive, from the base station, an indication of a future value of the channel quality parameter of the wireless link. The channel quality component 910 may compare the indicated future value to an actual value of the channel quality parameter. In some examples, the channel quality component 910 may determine, based on the comparing, that a difference between the indicated future value and the value is greater than or equal to a threshold value, the report transmitted in response to the determining. In some examples, the channel quality component 910 may determine, by the UE, an updated value for the channel quality parameter based on the comparing, and the report may include the updated value.

In some examples, the channel quality component 910 may measure, by the UE, the channel quality parameter for the wireless link to determine the actual value of the channel quality parameter. In some examples, the channel quality component 910 may receive, from the base station, an indication of a future value of the channel quality parameter of the wireless link determined by the base station. In some cases, the channel quality parameter of the wireless link includes an RSRP, or an SNR, or a CQI, or an RI, or a PMI, or a combination thereof.

The side information component 915 may transmit, to the base station, side information different from and in addition to the indication of the value of the channel quality information. In some examples, the side information component 915 may transmit the side information to the base station at least in part in response to the identified event trigger. In some cases, the side information includes UE mobility information, or a Doppler spread, or an indication of past receive beam changes by the UE, or a combination thereof. In some cases, the side information includes a time stamp for the measuring of the value. In some cases, the side information further includes an indication of a duration for which the side information is valid.

The resource component 920 may receive, in response to the transmitted indication of the value and the transmitted side information, an indication of resources for the UE to use to communicate on the wireless link. In some examples, the resource component 920 may receive a grant of the resources in response to the transmitted indication of the value and the transmitted side information.

The beam pair component 925 may receive a request to switch from using the first beam pair to using a second beam pair, the second beam pair including a different transmit beam, or a different receive beam, or a combination thereof, than the first beam pair. In some cases, a transmit beam of the base station and a receive beam of the UE, or a receive beam of the base station and a transmit beam of the UE, or a combination thereof.

The trigger component 930 may identify an event trigger has occurred. The report component 935 may transmit, to the base station, a report identifying a result of the comparing. In some examples, the report component 935 may receive, from the base station, a request for the UE to transmit the report, the report transmitted by the UE in response to the received request. In some examples, the report component 935 may refrain from transmitting, to the base station, a report identifying a result of the comparing based on determining that a difference between the indicated future value and the actual value is less than or equal to a threshold value.

The algorithm component 940 may identify an algorithm used by the base station to determine a future value of the channel quality parameter of the wireless link, the algorithm dependent on one or more parameters. In some examples, the algorithm component 940 may determine, by the UE, a recommended value for a parameter of the one or more parameters. In some examples, the algorithm component 940 may transmit an indication of the recommended value to the base station. The timing information component 945 may identify a time stamp for the value of the channel quality parameter, where the transmitted side information indicates the identified time stamp.

Figure 10:
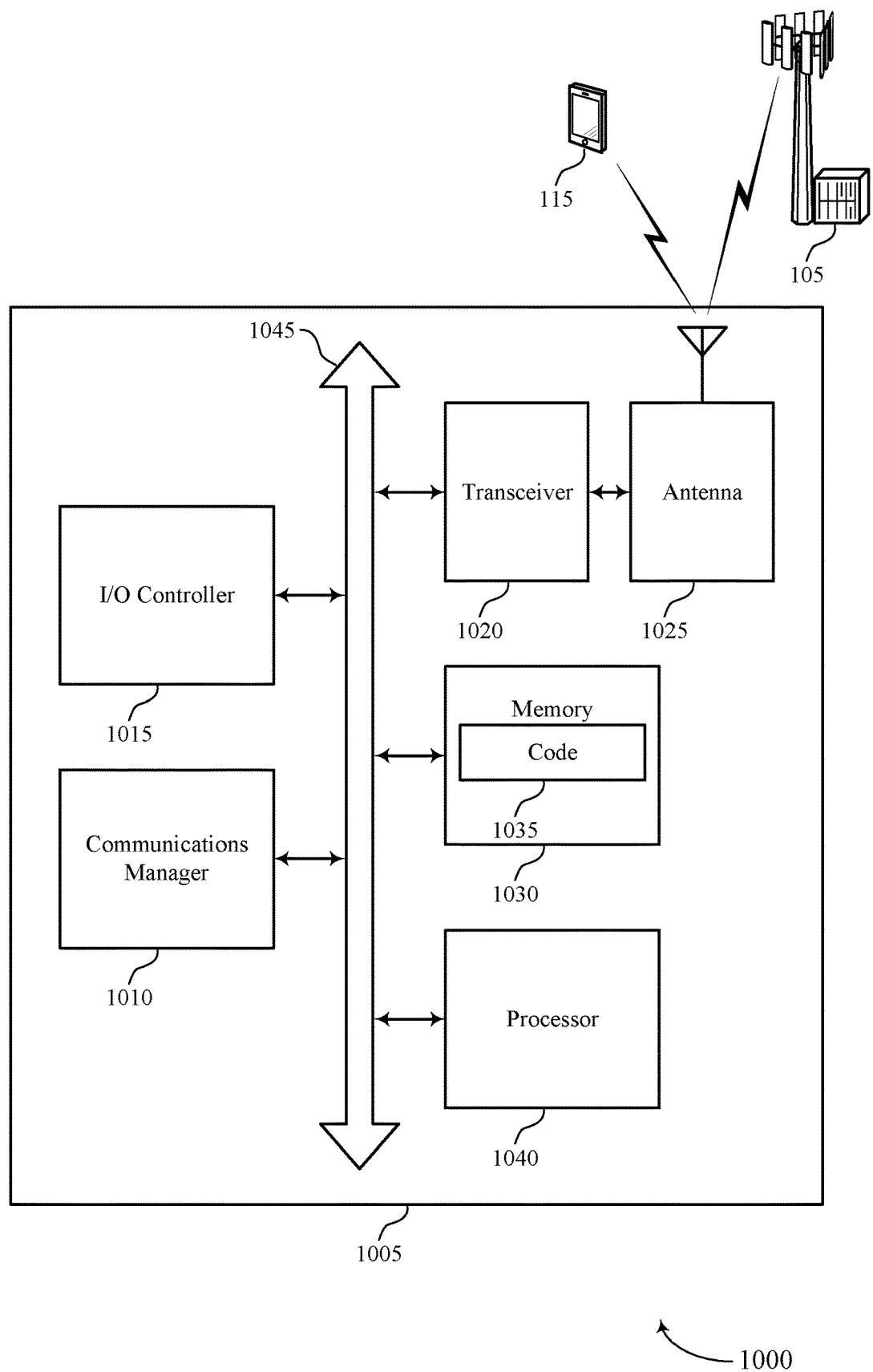
FIG. 10 shows a diagram of a system including a device that supports beam management using channel state information prediction in accordance with aspects of the present disclosure.

FIG. 10 shows a diagram of a system 1000 including a device 1005 that supports beam management using channel state information prediction in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit, to a base station, an indication of a value of a channel quality parameter of a wireless link including a first beam pair between the UE and the base station, transmit, to the base station, side information different from and in addition to the indication of the value of the channel quality information, and receive, in response to the transmitted indication of the value and the transmitted side information, an indication of resources for the UE to use to communicate on the wireless link.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS, ANDROID, MS-DOS, MS-WINDOWS, OS/2, UNIX, LINUX, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some examples, the device 1005 may include a single antenna 1025. However, in some examples, the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam management using channel state information prediction).

Figure 11:
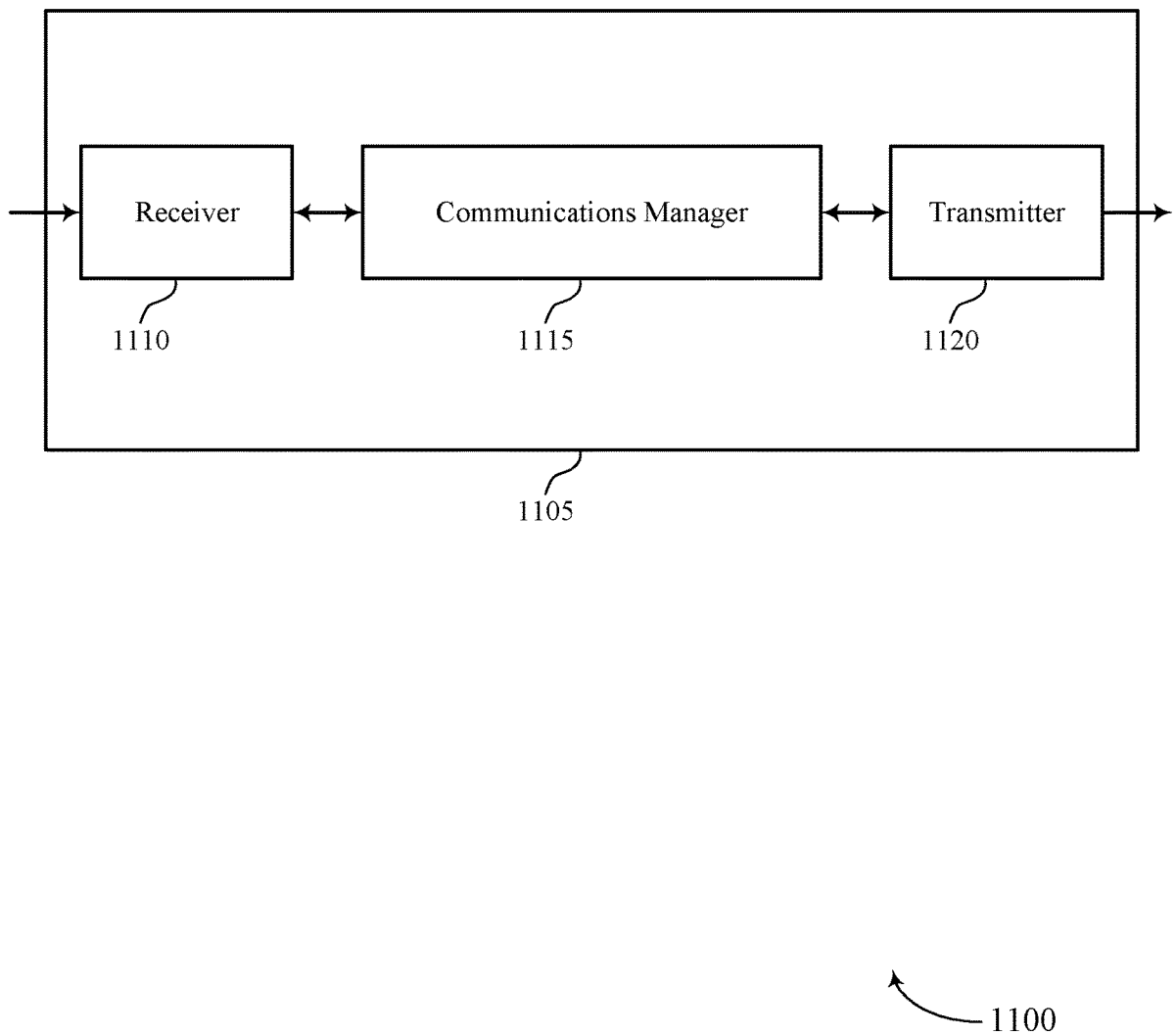
FIGS. 11 and 12 show block diagrams of devices that support beam management using channel state information prediction in accordance with aspects of the present disclosure.

FIG. 11 shows a block diagram 1100 of a device 1105 that supports beam management using channel state information prediction in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to beam management using channel state information prediction, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a UE, an indication of a value of a channel quality parameter of a wireless link including a first beam pair between the UE and the base station, determine, based on the value of the channel quality parameter and the received side information, a future value of the channel quality parameter, receive, from the UE, side information different from and in addition to the indication of the value of the channel quality information, determine, based on the determined future value of the channel quality parameter, resources for the UE to use to communicate with the base station on the wireless link, and transmit, to the UE, an indication of the determined resources. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
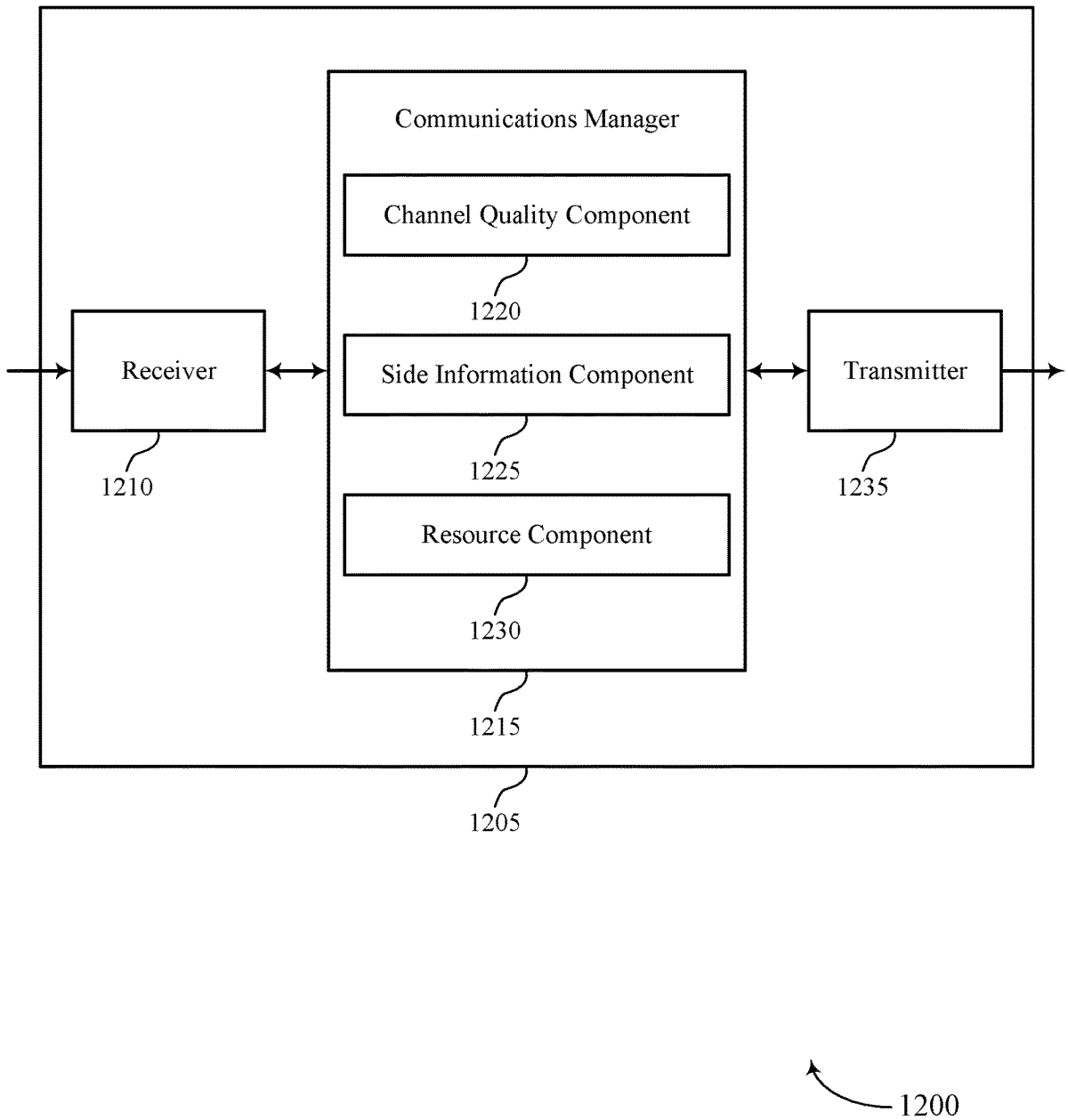

FIG. 12 shows a block diagram 1200 of a device 1205 that supports beam management using channel state information prediction in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to beam management using channel state information prediction, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a channel quality component 1220, a side information component 1225, and a resource component 1230. The communications manager 1215 may be an example of aspects of the communications manager 1410 described herein.

The channel quality component 1220 may receive, from a UE, an indication of a value of a channel quality parameter of a wireless link including a first beam pair between the UE and the base station and determine, based on the value of the channel quality parameter and the received side information, a future value of the channel quality parameter. The side information component 1225 may receive, from the UE, side information different from and in addition to the indication of the value of the channel quality information. The resource component 1230 may determine, based on the determined future value of the channel quality parameter, resources for the UE to use to communicate with the base station on the wireless link and transmit, to the UE, an indication of the determined resources.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
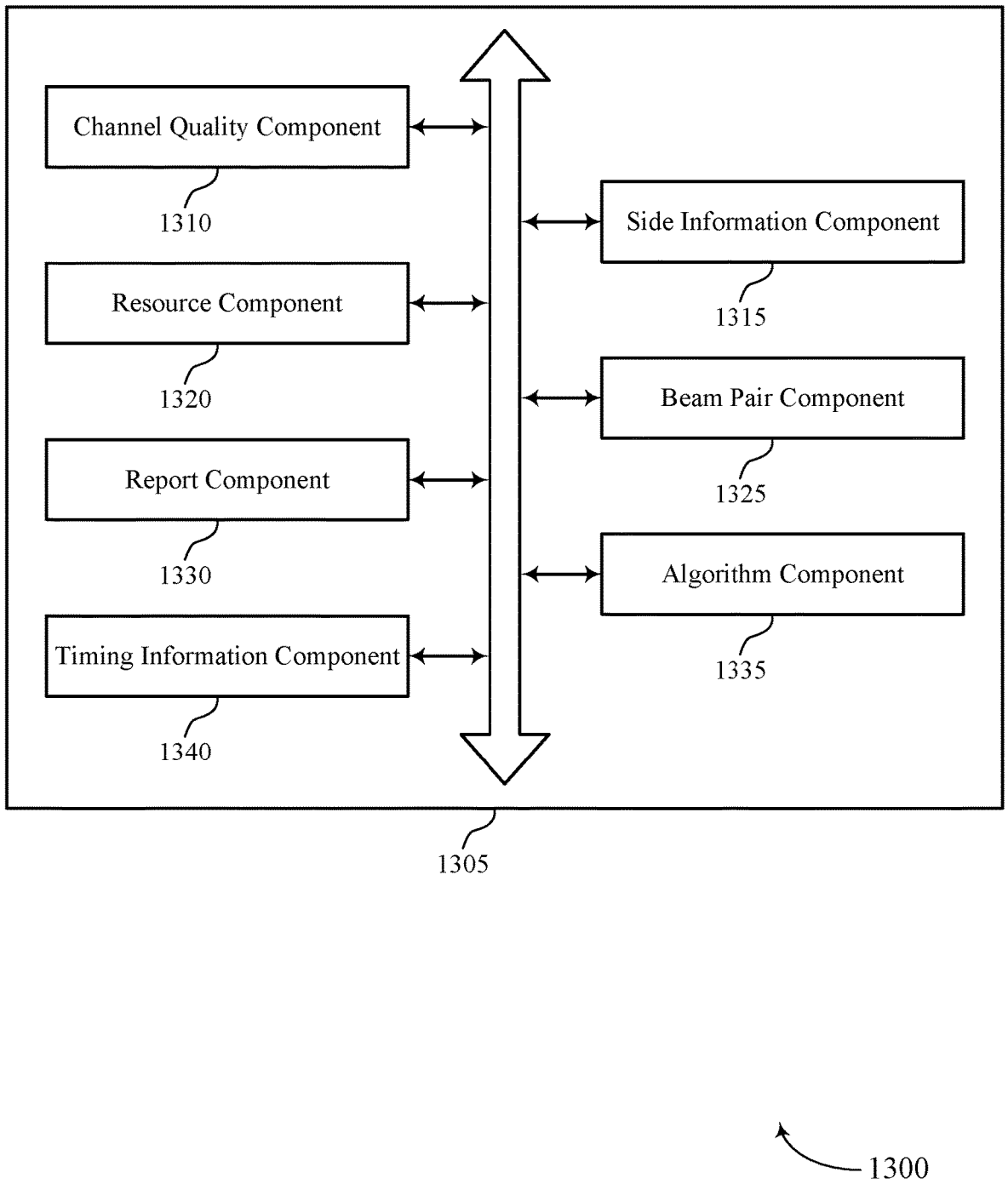
FIG. 13 shows a block diagram of a communications manager that supports beam management using channel state information prediction in accordance with aspects of the present disclosure.

FIG. 13 shows a block diagram 1300 of a communications manager 1305 that supports beam management using channel state information prediction in accordance with aspects of the present disclosure. The communications manager 1305 may be an example of aspects of a communications manager 1115, a communications manager 1215, or a communications manager 1410 described herein. The communications manager 1305 may include a channel quality component 1310, a side information component 1315, a resource component 1320, a beam pair component 1325, a report component 1330, an algorithm component 1335, and a timing information component 1340. Each of these modules may communicate, directly or indirectly, with one another (e.g., via one or more buses).

The channel quality component 1310 may receive, from a UE, an indication of a value of a channel quality parameter of a wireless link including a first beam pair between the UE and the base station. In some examples, the channel quality component 1310 may determine, based on the value of the channel quality parameter and the received side information, a future value of the channel quality parameter. The channel quality component 1310 may determine the future value of the channel quality parameter from the received value using a linear filter based on the received side information. In some examples, the channel quality component 1310 may transmit, to the UE, an indication of the determined future value. In some cases, the channel quality parameter of the wireless link includes a RSRP, or a SNR, or a CQI, or an RI, or a PMI, or a combination thereof.

The side information component 1315 may receive, from the UE, side information different from and in addition to the indication of the value of the channel quality information. In some cases, the side information includes UE mobility information, or a Doppler spread, or an indication of past receive beam changes by the UE, or a combination thereof. In some cases, the side information further includes an indication of a duration for which the side information is valid.

The resource component 1320 may determine, based on the determined future value of the channel quality parameter, resources for the UE to use to communicate with the base station on the wireless link. In some examples, the resource component 1320 may transmit, to the UE, an indication of the determined resources. In some examples, the resource component 1320 may transmit, to the UE, a grant identifying the determined resources.

The beam pair component 1325 may transmit a request for the UE to switch from using the first beam pair to using a second beam pair, the second beam pair including a different transmit beam, or a different receive beam, or a combination thereof, than the first beam pair. In some cases, a transmit beam of the base station and a receive beam of the UE, a receive beam of the base station and a transmit beam of the UE, or a combination thereof.

The report component 1330 may receive, from the UE, a report identifying a result of a comparison of the indicated future value to an actual value of the channel quality parameter. In some examples, the report component 1330 may transmit, to the UE, a request for the UE to transmit the report, the report transmitted by the UE in response to the request.

The algorithm component 1335 may receive, from the UE, an indication of a recommended value for one or more parameters associated with an algorithm used by the base station to determine the future value of the channel quality parameter.

The timing information component 1340 may identify a timing associated with the value of the channel quality parameter. In some examples, the timing information component 1340 may identify a time stamp for the value of the channel quality parameter in the side information received from the UE. In some examples, the timing information component 1340 may identify, by the base station, the timing associated with the value of the channel quality parameter based on a measurement configuration of the UE known to the base station. In some cases, the time stamp indicates a time at which the UE measured the value of the channel quality parameter.

Figure 14:
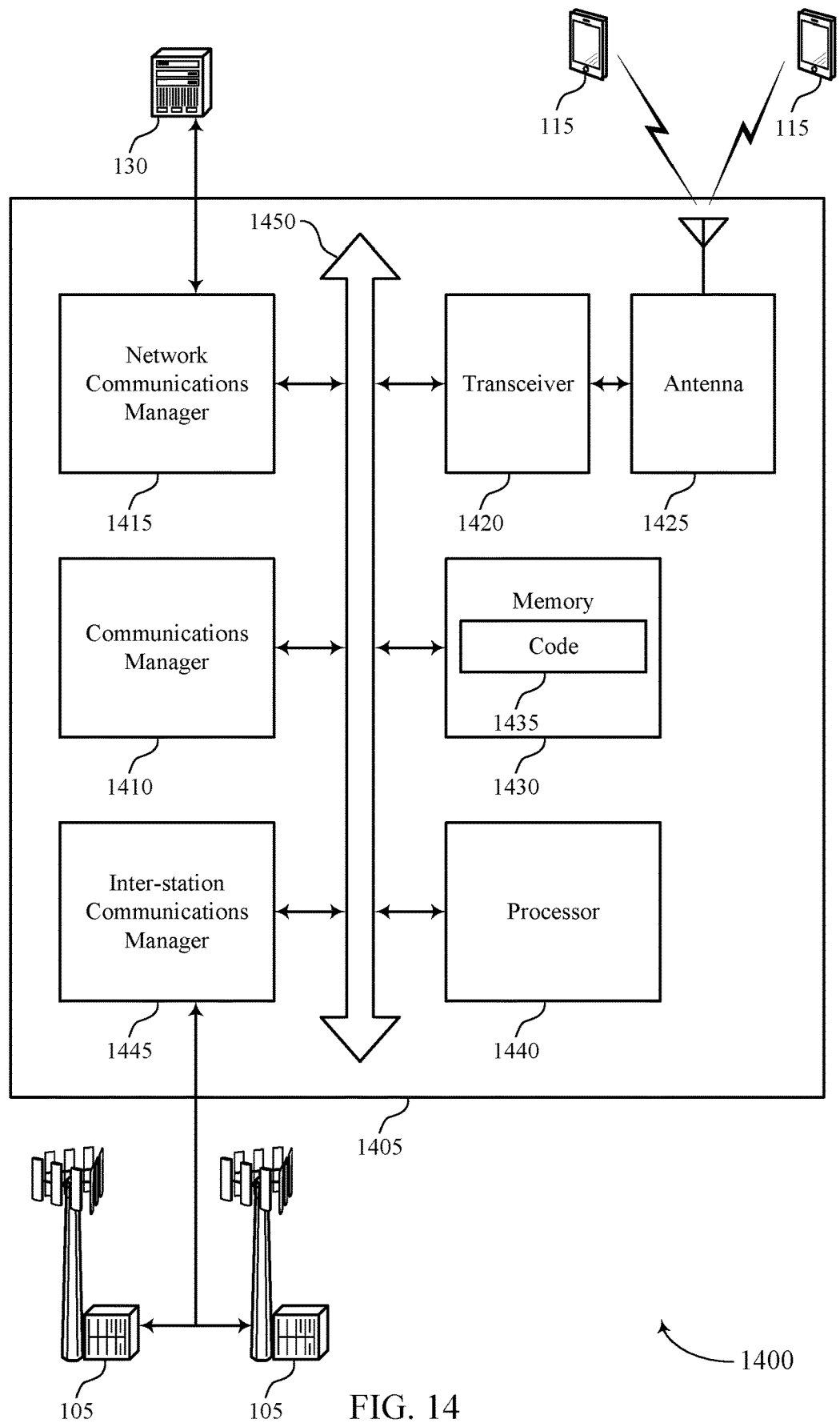
FIG. 14 shows a diagram of a system including a device that supports beam management using channel state information prediction in accordance with aspects of the present disclosure.

FIG. 14 shows a diagram of a system 1400 including a device 1405 that supports beam management using channel state information prediction in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may receive, from a UE, an indication of a value of a channel quality parameter of a wireless link including a first beam pair between the UE and the base station, determine, based on the value of the channel quality parameter and the received side information, a future value of the channel quality parameter, receive, from the UE, side information different from and in addition to the indication of the value of the channel quality information, determine, based on the determined future value of the channel quality parameter, resources for the UE to use to communicate with the base station on the wireless link, and transmit, to the UE, an indication of the determined resources.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some examples, the device 1405 may include a single antenna 1425. However, in some examples, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting beam management using channel state information prediction).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
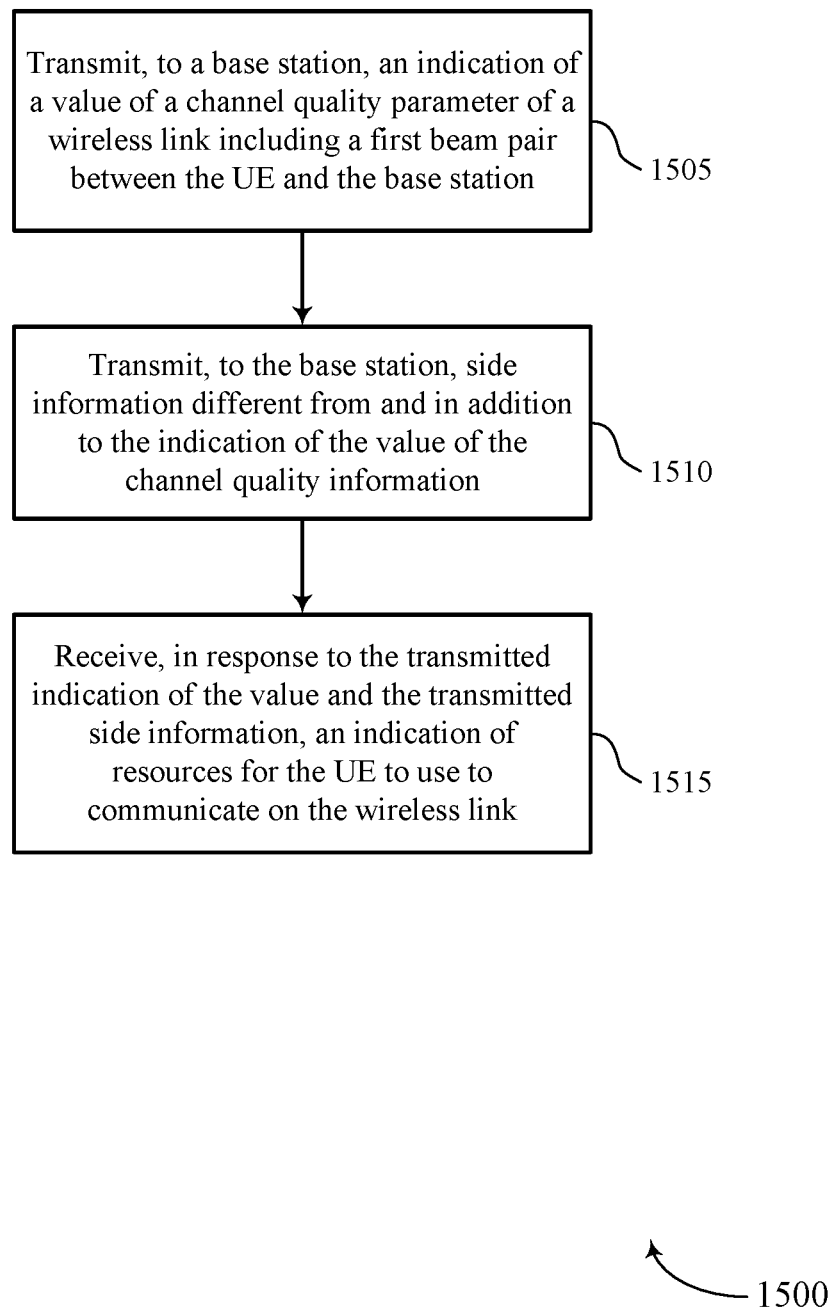
FIGS. 15 through 19 show flowcharts illustrating methods that support beam management using channel state information prediction in accordance with aspects of the present disclosure.

FIG. 15 shows a flowchart illustrating a method 1500 that supports beam management using channel state information prediction in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1505, the UE may transmit, to a base station, an indication of a value of a channel quality parameter of a wireless link including a first beam pair between the UE and the base station. The operations of 1505 may be performed according to the methods described herein. In some examples, aspects of the operations of 1505 may be performed by a channel quality component as described with reference to FIGS. 7 through 10.

At 1510, the UE may transmit, to the base station, side information different from and in addition to the indication of the value of the channel quality information. The operations of 1510 may be performed according to the methods described herein. In some examples, aspects of the operations of 1510 may be performed by a side information component as described with reference to FIGS. 7 through 10.

At 1515, the UE may receive, in response to the transmitted indication of the value and the transmitted side information, an indication of resources for the UE to use to communicate on the wireless link. The operations of 1515 may be performed according to the methods described herein. In some examples, aspects of the operations of 1515 may be performed by a resource component as described with reference to FIGS. 7 through 10.

Figure 16:
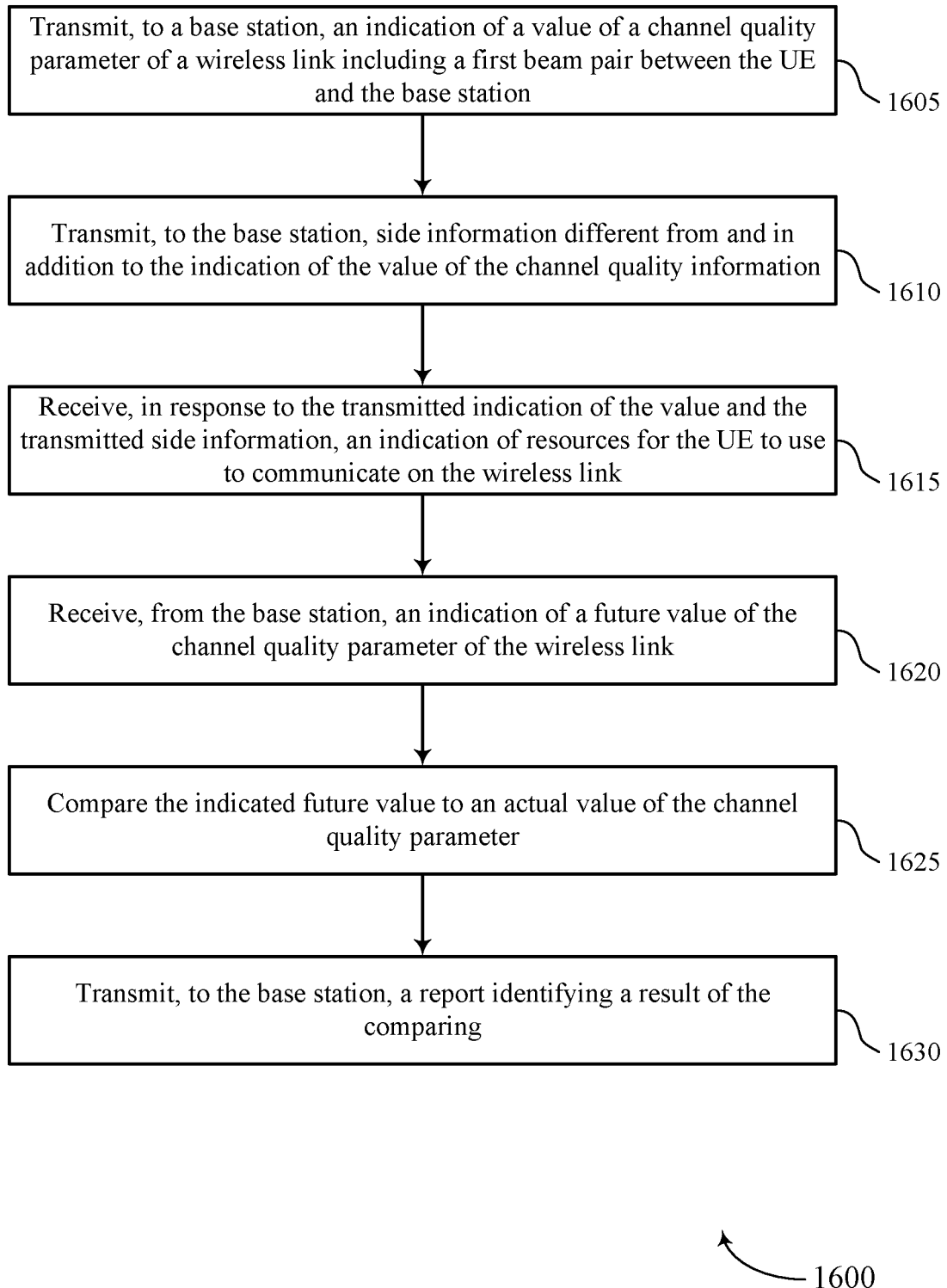

FIG. 16 shows a flowchart illustrating a method 1600 that supports beam management using channel state information prediction in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1605, the UE may transmit, to a base station, an indication of a value of a channel quality parameter of a wireless link including a first beam pair between the UE and the base station. The operations of 1605 may be performed according to the methods described herein. In some examples, aspects of the operations of 1605 may be performed by a channel quality component as described with reference to FIGS. 7 through 10.

At 1610, the UE may transmit, to the base station, side information different from and in addition to the indication of the value of the channel quality information. The operations of 1610 may be performed according to the methods described herein. In some examples, aspects of the operations of 1610 may be performed by a side information component as described with reference to FIGS. 7 through 10.

At 1615, the UE may receive, in response to the transmitted indication of the value and the transmitted side information, an indication of resources for the UE to use to communicate on the wireless link. The operations of 1615 may be performed according to the methods described herein. In some examples, aspects of the operations of 1615 may be performed by a resource component as described with reference to FIGS. 7 through 10.

At 1620, the UE may receive, from the base station, an indication of a future value of the channel quality parameter of the wireless link. The operations of 1620 may be performed according to the methods described herein. In some examples, aspects of the operations of 1620 may be performed by a channel quality component as described with reference to FIGS. 7 through 10.

At 1625, the UE may compare the indicated future value to an actual value of the channel quality parameter. The operations of 1625 may be performed according to the methods described herein. In some examples, aspects of the operations of 1625 may be performed by a channel quality component as described with reference to FIGS. 7 through 10.

At 1630, the UE may transmit, to the base station, a report identifying a result of the comparing. The operations of 1630 may be performed according to the methods described herein. In some examples, aspects of the operations of 1630 may be performed by a report component as described with reference to FIGS. 7 through 10.

Figure 17:
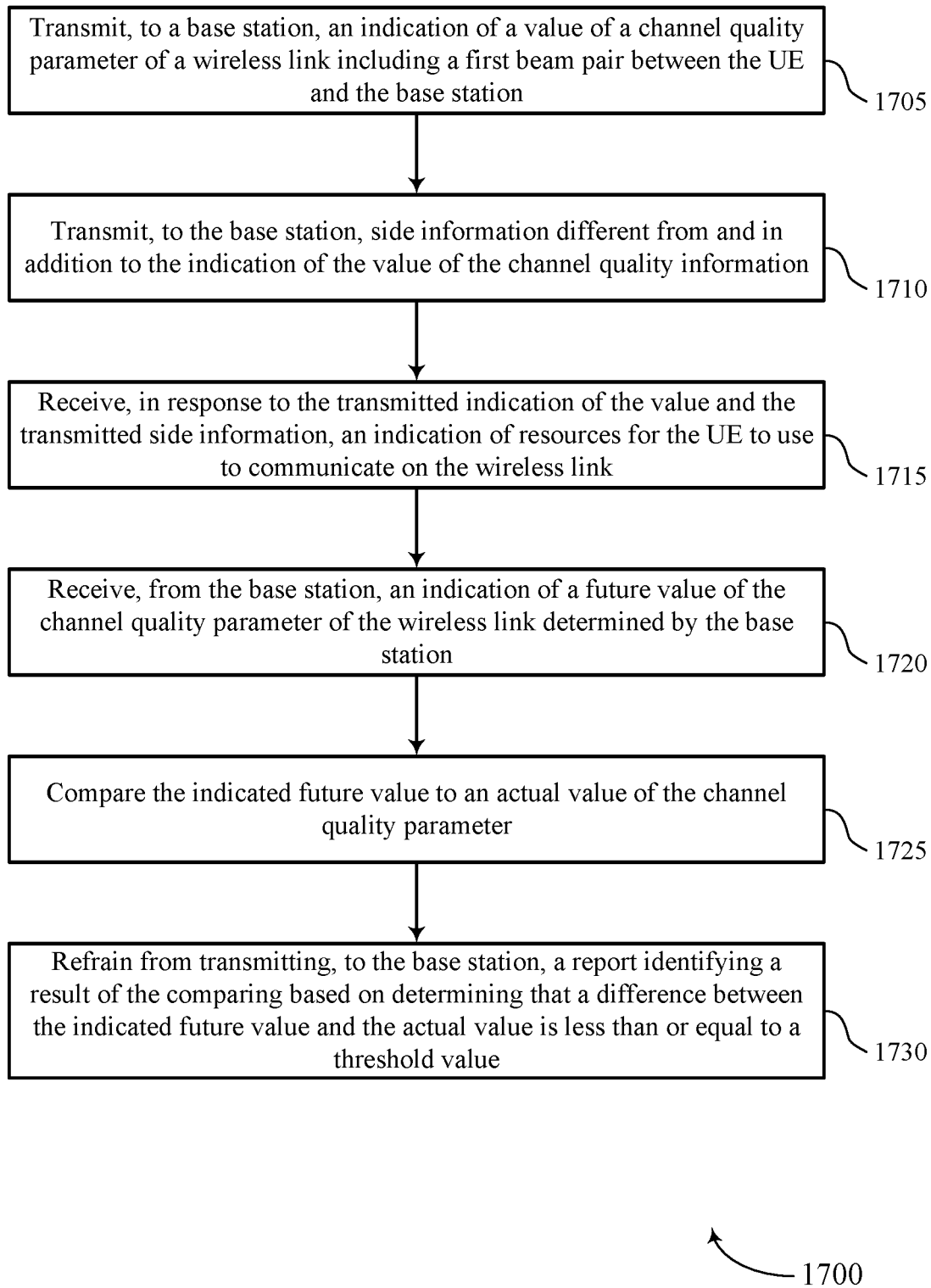

FIG. 17 shows a flowchart illustrating a method 1700 that supports beam management using channel state information prediction in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally, or alternatively, a UE may perform aspects of the functions described herein using special-purpose hardware.

At 1705, the UE may transmit, to a base station, an indication of a value of a channel quality parameter of a wireless link including a first beam pair between the UE and the base station. The operations of 1705 may be performed according to the methods described herein. In some examples, aspects of the operations of 1705 may be performed by a channel quality component as described with reference to FIGS. 7 through 10.

At 1710, the UE may transmit, to the base station, side information different from and in addition to the indication of the value of the channel quality information. The operations of 1710 may be performed according to the methods described herein. In some examples, aspects of the operations of 1710 may be performed by a side information component as described with reference to FIGS. 7 through 10.

At 1715, the UE may receive, in response to the transmitted indication of the value and the transmitted side information, an indication of resources for the UE to use to communicate on the wireless link. The operations of 1715 may be performed according to the methods described herein. In some examples, aspects of the operations of 1715 may be performed by a resource component as described with reference to FIGS. 7 through 10.

At 1720, the UE may receive, from the base station, an indication of a future value of the channel quality parameter of the wireless link determined by the base station. The operations of 1720 may be performed according to the methods described herein. In some examples, aspects of the operations of 1720 may be performed by a channel quality component as described with reference to FIGS. 7 through 10.

At 1725, the UE may compare the indicated future value to an actual value of the channel quality parameter. The operations of 1725 may be performed according to the methods described herein. In some examples, aspects of the operations of 1725 may be performed by a channel quality component as described with reference to FIGS. 7 through 10.

At 1730, the UE may refrain from transmitting, to the base station, a report identifying a result of the comparing based on determining that a difference between the indicated future value and the actual value is less than or equal to a threshold value. The operations of 1730 may be performed according to the methods described herein. In some examples, aspects of the operations of 1730 may be performed by a report component as described with reference to FIGS. 7 through 10.

Figure 18:
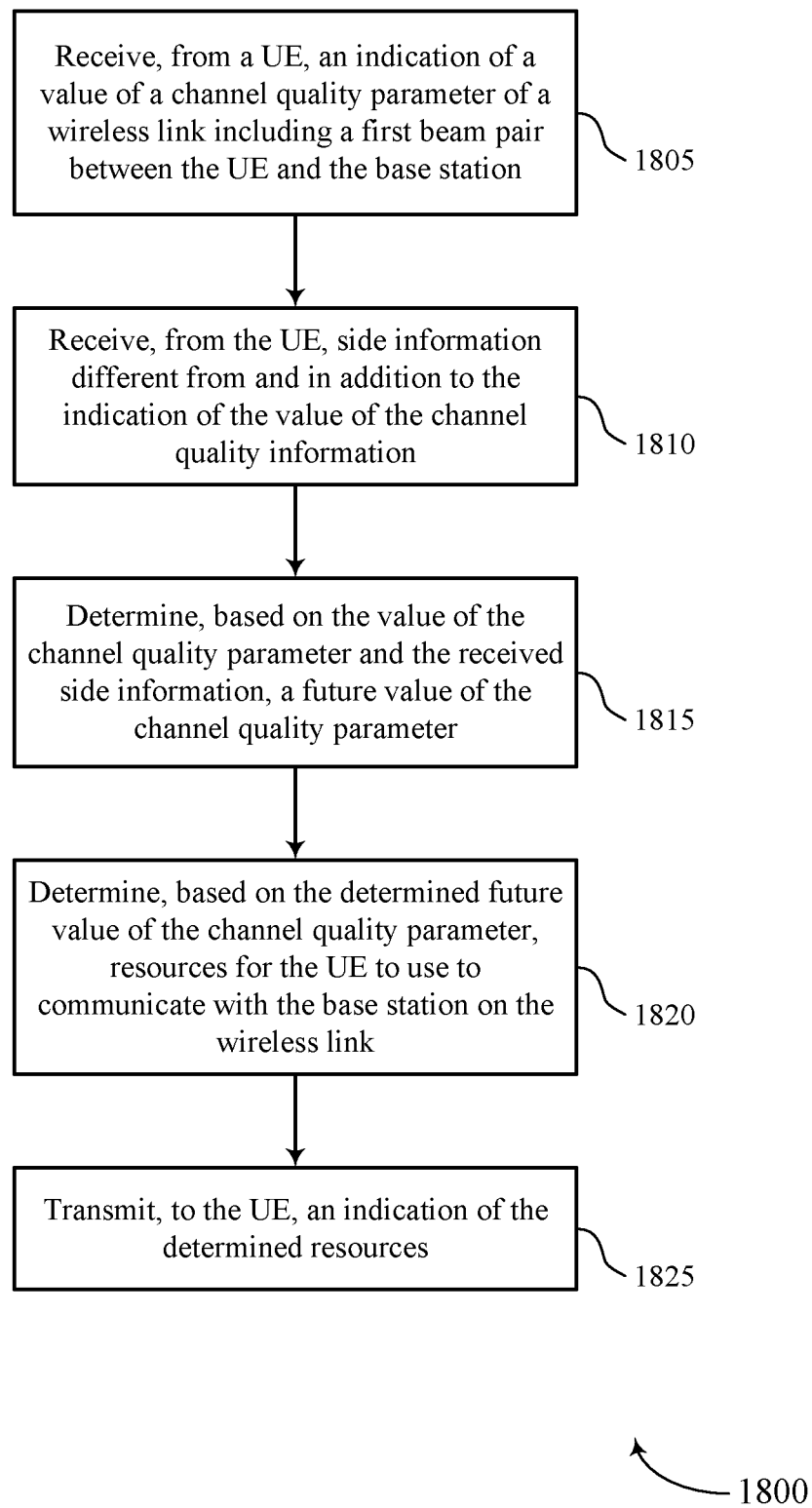

FIG. 18 shows a flowchart illustrating a method 1800 that supports beam management using channel state information prediction in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally, or alternatively, a base station may perform aspects of the functions described herein using special-purpose hardware.

At 1805, the base station may receive, from a UE, an indication of a value of a channel quality parameter of a wireless link including a first beam pair between the UE and the base station. The operations of 1805 may be performed according to the methods described herein. In some examples, aspects of the operations of 1805 may be performed by a channel quality component as described with reference to FIGS. 11 through 14.

At 1810, the base station may receive, from the UE, side information different from and in addition to the indication of the value of the channel quality information. The operations of 1810 may be performed according to the methods described herein. In some examples, aspects of the operations of 1810 may be performed by a side information component as described with reference to FIGS. 11 through 14.

At 1815, the base station may determine, based on the value of the channel quality parameter and the received side information, a future value of the channel quality parameter. The operations of 1815 may be performed according to the methods described herein. In some examples, aspects of the operations of 1815 may be performed by a channel quality component as described with reference to FIGS. 11 through 14.

At 1820, the base station may determine, based on the determined future value of the channel quality parameter, resources for the UE to use to communicate with the base station on the wireless link. The operations of 1820 may be performed according to the methods described herein. In some examples, aspects of the operations of 1820 may be performed by a resource component as described with reference to FIGS. 11 through 14.

At 1825, the base station may transmit, to the UE, an indication of the determined resources. The operations of 1825 may be performed according to the methods described herein. In some examples, aspects of the operations of 1825 may be performed by a resource component as described with reference to FIGS. 11 through 14.

Figure 19:
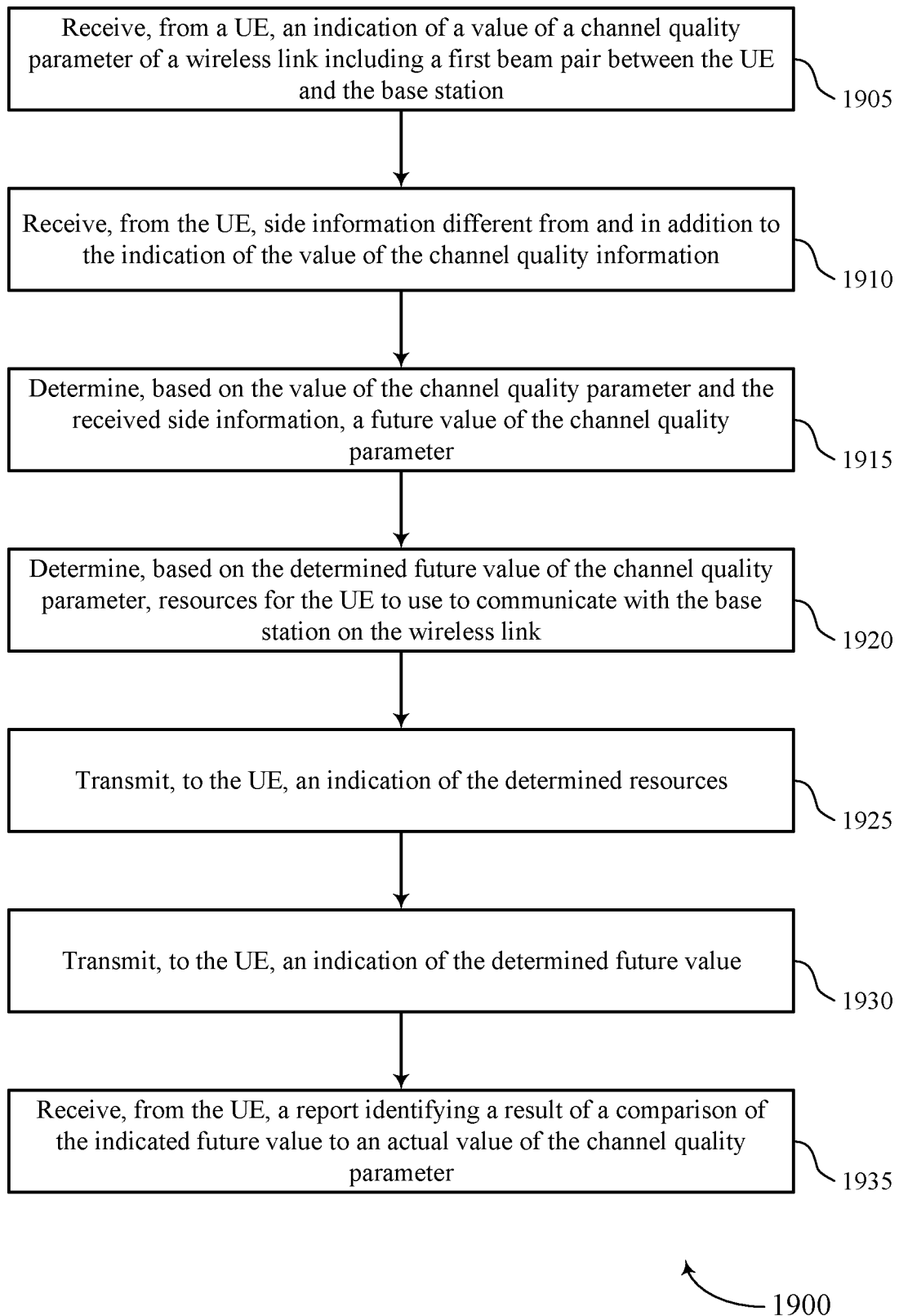

FIG. 19 shows a flowchart illustrating a method 1900 that supports beam management using channel state information prediction in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described herein. Additionally, or alternatively, a base station may perform aspects of the functions described herein using special-purpose hardware.

At 1905, the base station may receive, from a UE, an indication of a value of a channel quality parameter of a wireless link including a first beam pair between the UE and the base station. The operations of 1905 may be performed according to the methods described herein. In some examples, aspects of the operations of 1905 may be performed by a channel quality component as described with reference to FIGS. 11 through 14.

At 1910, the base station may receive, from the UE, side information different from and in addition to the indication of the value of the channel quality information. The operations of 1910 may be performed according to the methods described herein. In some examples, aspects of the operations of 1910 may be performed by a side information component as described with reference to FIGS. 11 through 14.

At 1915, the base station may determine, based on the value of the channel quality parameter and the received side information, a future value of the channel quality parameter. The operations of 1915 may be performed according to the methods described herein. In some examples, aspects of the operations of 1915 may be performed by a channel quality component as described with reference to FIGS. 11 through 14.

At 1920, the base station may determine, based on the determined future value of the channel quality parameter, resources for the UE to use to communicate with the base station on the wireless link. The operations of 1920 may be performed according to the methods described herein. In some examples, aspects of the operations of 1920 may be performed by a resource component as described with reference to FIGS. 11 through 14.

At 1925, the base station may transmit, to the UE, an indication of the determined resources. The operations of 1925 may be performed according to the methods described herein. In some examples, aspects of the operations of 1925 may be performed by a resource component as described with reference to FIGS. 11 through 14.

At 1930, the base station may transmit, to the UE, an indication of the determined future value. The operations of 1930 may be performed according to the methods described herein. In some examples, aspects of the operations of 1930 may be performed by a channel quality component as described with reference to FIGS. 11 through 14.

At 1935, the base station may receive, from the UE, a report identifying a result of a comparison of the indicated future value to an actual value of the channel quality parameter. The operations of 1935 may be performed according to the methods described herein. In some examples, aspects of the operations of 1935 may be performed by a report component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting, an indication of a value of a channel quality parameter of a first set of resources for the UE to use to communicate on a wireless link comprising a first beam pair between the UE and a network entity;
    transmitting side information different from and in addition to the indication of the value of the channel quality parameter, the side information associated with a future value of the channel quality parameter for the first set of resources of the wireless link, the future value of the channel quality parameter indicating a predicted beam failure event of the first beam pair; and
    receiving, before the predicted beam failure event and in response to the transmitted indication of the value and the transmitted side information, an indication for the UE to switch to a second set of resources for the UE to use to communicate on the wireless link.

2. The method of claim 1, wherein transmitting the side information comprises:
    identifying an event trigger has occurred; and
    transmitting the side information to the network entity in response to the identified event trigger.

3. The method of claim 1, further comprising:
    receiving, from the network entity, an indication of the future value of the channel quality parameter of the wireless link;
    comparing the indicated future value to an actual value of the channel quality parameter; and
    transmitting, to the network entity, a report identifying a result of the comparing.

4. The method of claim 3, wherein the network entity determined the future value based at least in part on the transmitted side information and the transmitted indication of the value.

5. The method of claim 3, further comprising:
    determining, based at least in part on the comparing, that a difference between the indicated future value and the value is greater than or equal to a threshold value, the report transmitted in response to the determining.

6. The method of claim 3, further comprising:
    receiving, from the network entity, a request for the UE to transmit the report, the report transmitted by the UE in response to the received request.

7. The method of claim 3, further comprising:
    determining, by the UE, an updated value for the channel quality parameter based at least in part on the comparing, the report comprising the updated value.

8. The method of claim 3, further comprising:
    measuring, by the UE, the channel quality parameter for the wireless link to determine the actual value of the channel quality parameter.

9. The method of claim 1, further comprising:
    receiving, from the network entity, an indication of the future value of the channel quality parameter of the wireless link determined by the network entity;
    comparing the indicated future value to an actual value of the channel quality parameter; and
    refraining from transmitting, to the network entity, a report identifying a result of the comparing based at least in part on determining that a difference between the indicated future value and the actual value is less than or equal to a threshold value.

10. The method of claim 1, further comprising:
    identifying an algorithm used by the network entity to determine the future value of the channel quality parameter of the wireless link, the algorithm dependent on one or more parameters.

11. The method of claim 1, wherein the side information comprises UE mobility information, or a Doppler spread, or an indication of past receive beam changes by the UE, or a combination thereof.

12. The method of claim 1, further comprising:
    identifying a time stamp for the value of the channel quality parameter, wherein the transmitted side information indicates the identified time stamp.

13. The method of claim 1, wherein receiving the indication of resources comprises:
    receiving a request to switch from using the first beam pair to using a second beam pair, the second beam pair comprising a different transmit beam, or a different receive beam, or a combination thereof, than the first beam pair.

14. The method of claim 1, wherein receiving the indication of resources comprises:
    receiving a grant of the resources in response to the transmitted indication of the value and the transmitted side information.

15. The method of claim 1, further comprising:
    measuring the value of the channel quality parameter, wherein the value of the channel quality parameter comprises the measured value.

16. The method of claim 15, wherein the side information comprises a time stamp for the measuring of the value.

17. The method of claim 1, wherein the side information further comprises an indication of a duration for which the side information is valid.

18. A method for wireless communications at a network entity, comprising:
    receiving, from a user equipment (UE), an indication of a value of a channel quality parameter of a first set of resources for the UE to use to communicate with the network entity on a wireless link comprising a first beam pair between the UE and the network entity;
    receiving, from the UE, side information different from and in addition to the indication of the value of the channel quality parameter;
    determining, based at least in part on the value of the channel quality parameter and the received side information, a future value of the channel quality parameter for the first set of resources of the wireless link, the future value of the channel quality parameter indicating a predicted beam failure event of the first beam pair;
    determining, based at least in part on the determined future value of the channel quality parameter, a second set of resources for the UE to use to communicate with the network entity on the wireless link; and transmitting, to the UE, an indication of the determined second set of resources for the UE to switch to before the predicted beam failure event.

19. The method of claim 18, wherein determining the future value of the channel quality parameter comprises:

determining the future value of the channel quality parameter from the received value using a linear filter based at least in part on the received side information.

20. The method of claim 18, wherein transmitting the indication of the determined resources comprises:

transmitting a request for the UE to switch from using the first beam pair to using a second beam pair, the second beam pair comprising a different transmit beam, or a different receive beam, or a combination thereof, than the first beam pair.

21. The method of claim 18, further comprising:

transmitting, to the UE, an indication of the determined future value; and receiving, from the UE, a report identifying a result of a comparison of the indicated future value to an actual value of the channel quality parameter.

22. The method of claim 21, further comprising:

transmitting, to the UE, a request for the UE to transmit the report, the report transmitted by the UE in response to the request.

23. The method of claim 18, wherein transmitting the indication of the determined resources comprises:

transmitting, to the UE, a grant identifying the determined resources.

24. The method of claim 18, further comprising:

receiving, from the UE, an indication of a recommended value for one or more parameters associated with an algorithm used by the network entity to determine the future value of the channel quality parameter.

25. The method of claim 18, wherein the side information comprises UE mobility information, or a Doppler spread, or an indication of past receive beam changes by the UE, or a combination thereof.

26. The method of claim 18, further comprising:

identifying a timing associated with the value of the channel quality parameter, the timing comprising a time stamp for the value of the channel quality parameter in the side information received from the UE.

27. The method of claim 18, further comprising:

identifying, by the network entity, a time stamp associated with the value of the channel quality parameter based at least in part on a measurement configuration of the UE known to the network entity, wherein the time stamp indicates a time at which the UE measured the value of the channel quality parameter.

28. The method of claim 18, wherein the side information further comprises an indication of a duration for which the side information is valid.

29. An apparatus for wireless communications at a user equipment (UE), comprising:

a processor;

memory in electronic communication with the processor; and instructions stored in the memory and executable by the processor to cause the apparatus to:

transmit, to a network entity, an indication of a value of a channel quality parameter of a first set of resources for the UE to use to communicate on a wireless link comprising a first beam pair between the UE and the network entity;

transmit, to the network entity, side information different from and in addition to the indication of the value of the channel quality parameter, the side information associated with a future value of the channel quality parameter for the first set of resources of the wireless link, the future value of the channel quality parameter indicating a predicted beam failure event of the first beam pair; and receive, before the predicted beam failure event and in response to the transmitted indication of the value and the transmitted side information, an indication for the UE to switch to a second set of resources for the UE to use to communicate on the wireless link.

30. An apparatus for wireless communications at a network entity, comprising:

a processor;

memory in electronic communication with the processor; and instructions stored in the memory and executable by the processor to cause the apparatus to:

receive, from a user equipment (UE), an indication of a value of a channel quality parameter of a first set of resources for the UE to use to communicate on a wireless link comprising a first beam pair between the UE and the network entity;

receive, from the UE, side information different from and in addition to the indication of the value of the channel quality parameter;

determine, based at least in part on the value of the channel quality parameter and the received side information, a future value of the channel quality parameter for the first set of resources of the wireless link, the future value of the channel quality parameter indicating a predicted beam failure event of the first beam pair;

determine, based at least in part on the determined future value of the channel quality parameter, a second set of resources for the UE to use to communicate with the network entity on the wireless link; and transmit, to the UE, an indication of the determined second set of resources for the UE to switch to before the predicted beam failure event.

* * * * *